(12) United States Patent
Simpson et al.

(10) Patent No.: US 7,196,803 B1
(45) Date of Patent: Mar. 27, 2007

(54) SYSTEM AND METHOD FOR PRINTING TO A PRINTER WITHOUT THE USE OF A PRINT DRIVER

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 09/712,337

(22) Filed: Nov. 13, 2000

(51) Int. Cl.
*G06F 15/00* (2006.01)
(52) U.S. Cl. ...................... 358/1.13; 358/1.1
(58) Field of Classification Search ............ 358/1.1, 358/1.6, 1.13, 1.15, 1.2, 1.7, 1.9, 1.14
See application file for complete search history.

(56) References Cited

U.S. PATENT DOCUMENTS

| | | | | |
|---|---|---|---|---|
| 5,602,974 | A | * | 2/1997 | Shaw et al. ................. 358/1.15 |
| 6,129,457 | A | * | 10/2000 | Thompson et al. ........... 358/1.2 |
| 6,144,997 | A | | 11/2000 | Lamming et al. ............ 709/217 |
| 6,182,242 | B1 | * | 1/2001 | Brogan et al. ................. 714/26 |
| 6,344,901 | B1 | * | 2/2002 | Simon et al. ................. 358/1.9 |
| 6,421,748 | B1 | * | 7/2002 | Lin et al. ...................... 710/65 |
| 6,766,519 | B1 | * | 7/2004 | Burriss et al. ............... 719/321 |

FOREIGN PATENT DOCUMENTS

JP      2002325161 A  * 11/2002
WO     WO03/014917 A1 *  2/2003

* cited by examiner

*Primary Examiner*—Gabriel Garcia
(74) *Attorney, Agent, or Firm*—Matthew L. Wade

(57) ABSTRACT

System and method for printing to a printer without the use of a print drive.

12 Claims, 25 Drawing Sheets

SYSTEM AND METHOD FOR PRINTING TO A PRINTER WITHOUT THE USE OF A PRINT DRIVER

BACKGROUND OF THE INVENTION

It is well known that many devices can transfer data to an externally connected device (receiving device) in order to allow the receiving device to process the data in some particular way. It is often the case that the receiving device requires that the data is received in a particular form. As a result, the transferring device must often be specialty configured to convert data from one form to another so that the receiving device can interpret the data. This often involves having to develop and install special software in the transferring device as well as configuring the device to make use of the special software.

For example, consider a typical prior art personal computer that is connected to a network. Also connected to the network are a number of printers. In order for the personal computer to make use of each one of the printers,, the computer must be configured properly. This can involve the user having to locate print driver software for each one the printers, installing the driver software into the computer and then configuring the computer to make use of each instance of driver software. Having to perform these tasks can be complicated and can present a significant problem to the user.

Consider the magnitude of this problem as applied to printing over a large network or the Internet. It can be seen that in this type of environment, a personal computer can potentially be used to print to a very large number of printers. Unfortunately, having to configure the personal computer to make use of all these printers would be extremely difficult.

SUMMARY OF THE INVENTION

The present invention may be implemented as a computer implemented method of printing an image. The method includes selecting a set of data to be accessed in response to a generic access request; and receiving content from an external device. The content is executable by a computer to cause a computer to generate a generic access request to retrieve a set of data describing an image and further executable to use the retrieved set of data to generate a printjob. The method further includes executing the content so as to generate the generic access requests; responding to the generic access requests by retrieving the selected set of data; and executing the content so as to use the retrieved set of data to generate the print job.

DETAILED DESCRIPTION OF THE INVENTION

Figure 1:
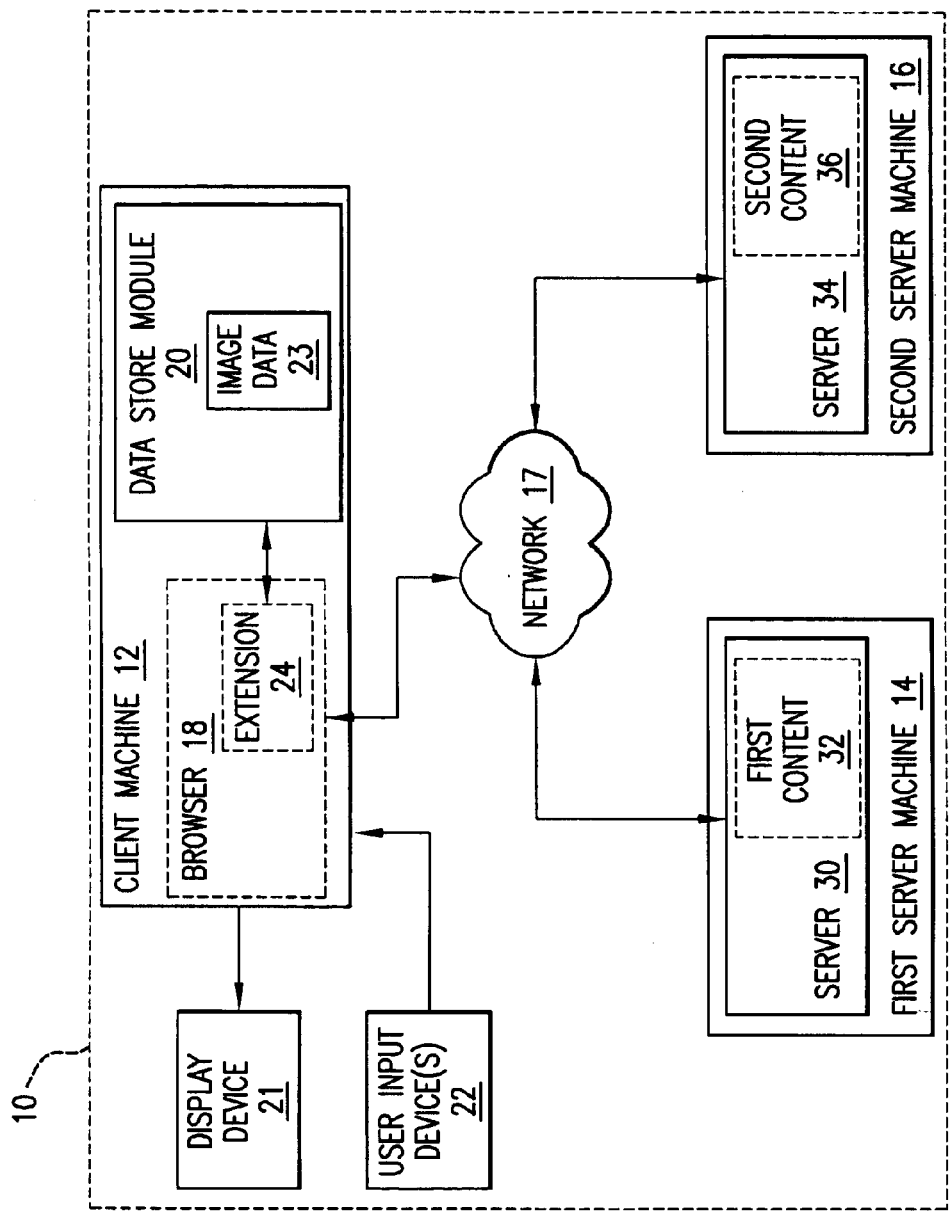
FIG. 1 provides an architectural diagram of a client-server system that operates in accordance with a first embodiment of the invention.

To facilitate a complete understanding of the invention, a description of several preferred embodiments is arranged within the following sections:

1. GLOSSARY OF TERMS AND ACRONYMS

2. DESCRIPTION OF A FIRST ILLUSTRATIVE EMBODIMENT

3. DESCRIPTION OF A SECOND ILLUSTRATIVE EMBODIMENT

4. CONCLUSION

1. Glossary of Terms and Acronyms

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages, or other types of WEB content, is commonly referred to as a "Web server."

Content. A set of executable instructions that is served by a server to a client and which is intended to be executed by the client so as to provide the client with certain functionality. WEB content refers to content that is meant to be executed by operation of a WEB browser. WEB content, therefore, may include (the following is a non-exhaustive list) one or more of the following: HTML code, JAVA script, JAVA Program(s) and C-"Sharp" code Hyperlink. A navigational link from one document to another, from one portion (or component) of a document to another, or to a WEB resource, such as a JAVA applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a WEB Site can have additional functionality, For example, a WEB site may have the ability to print documents, scan documents, etc.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet or a network. The general format of a URL is protocol: //machine address:port/path/filename.

2. DESCRIPTION OF A FIRST ILLUSTRATIVE EMBODIMENT

FIG. 1 provides an architectural diagram illustrating a client-server system 10 that operates according a first embodiment of the invention. The client-server system 10 includes a client machine 12, a first server machine 14 and a second server machine 16 connected via a network 17. All of these devices operate in accordance with the invention. It is noted, however, that a client-server system 10 according to the invention may include more that one client machine and one or more server machines.

The client machine 12 includes a browser 18, a storage module 20, a display device 21 (e.g., a CRT monitor) and a user input device 22 (e.g., a keyboard). It is noted that the storage module 20 may represent any type of data storage device.

Additionally, the browser 18 includes an extension component (extension) 24 that provides an interface between WEB content executing in the Browser 18 and the storage module 20. Further details regarding the functionality of the extension 24 are provided below The first server machine 14 includes a first server 30. The first server 30 can respond to receiving an appropriate request (over the network 17) from the browser 18 by serving to the browser 18 a first WEB content 32.

Similarly, the second server machine 16 includes a second Server 34. The second server 34 can respond to receiving a request from the browser 18 by serving to the browser 18 a second WEB content 36.

It is important to note that the client machine 12, the first WEB content 32 and the second WEB content 36 are all in accordance with a system wide standard. This standard specifies "generic access instructions", "generic access requests" and "target data".

For purposes of this application, the term "generic access instruction" refers to an executable instruction that is intended to cause the executing device to generate generic access requests in order to access a set of target data. A generic access instruction, however, does not include the location of the target data itself and neither does the generic access requests. Importantly, the target data is pre-selected (typically by a user) and its location is determined from information that is maintained locally within the executing computer. For this reason, the target data for a particular computer is said to be "associated" with that computer. Thus, for example, the target data that is associated with computer "A" is the data that computer "A" will access in response to a generic access instruction. The target data that is associated with computer "B" is the data that computer "B" will access in response to the identical generic access instruction.

Furthermore, in the case wherein the target data represents an image, that image is referred to herein as the "target image". In this simplified example, it will be assumed that all generic access instructions specified by the system wide standard mentioned above are for accessing data that describes an image.

In the present embodiment, the extension 24 is configured to respond to the execution of generic access instructions by generating corresponding (device specific commands) that causes the target data associated with the client machine 12 to be accessed. How the target data for the client machine 12 is identified is explained below.

It will be understood by a person skilled in the art, after a consideration of this document, that the extension 24 may be implemented by an application programming interface (API). The API being in accordance with the system wide standard mentioned above. Thus, the generic access instructions when executed may cause API calls to be issued to the API in order or effect the data access. These API calls are the generic access requests specified by the standard. It will also be recognized that there are many other ways (both hardware and software) to implement this same functionality. The present invention is not limited to any one way.

Both the first WEB content 32 and the second WEB content 36 includes generic access instructions. For illustration purposes, it is assumed that the first WEB content 32 is for causing a client machine to display the target image described by that machine's associated target data. The second WEB content 36 is for causing a client machine to generate a print job that describes the target image and to transmit the print job to a printer. This is done so as to cause the printer to print the target image.

Figure 2:
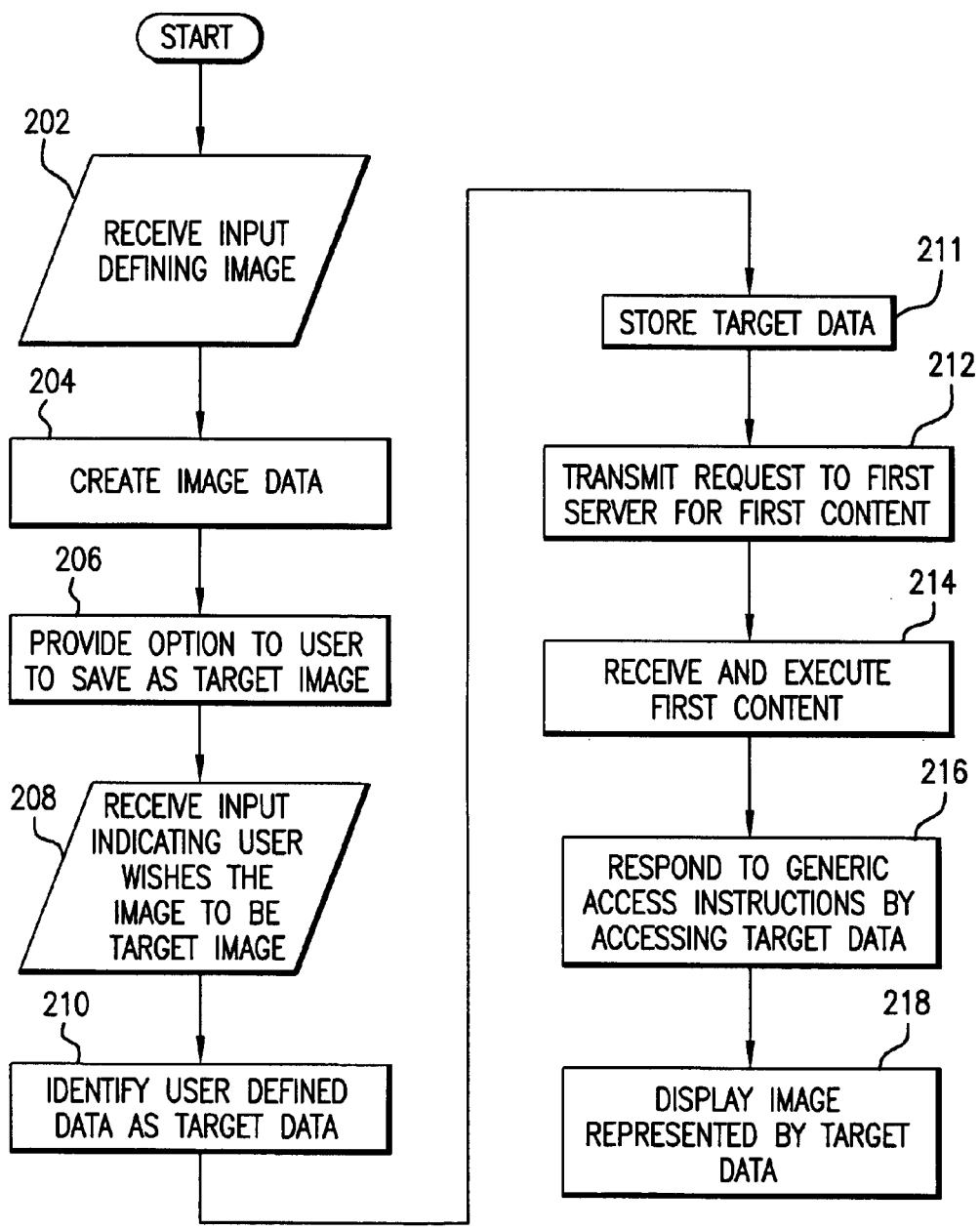
FIG. 2 illustrates an example of the operation of a client machine in the client-server system.

FIG. 2 illustrates an example of the operation of the client machine 12. In this example, it is assumed that the client machine 12 provides a means for the user to define an image by providing input via the user input devices 22. To provide this functionality, the client machine 12 may include a local application (e.g., a word processing application) that accepts input from a user to define an image (e.g., a single or multiple page document) or the user may be able to operate the client machine 12 to download the image from an external device.

Referring now to FIG. 2, it is assumed that a user provides input (via the user input device 22) to the client machine 12 in order to define an image. The client machine 12 receives this input at step 202 and creates a set of (user defined) data 23 that describes the user defined image (step 204).

Next, the client machine 12 provides the user with a selectable option to store the image data as a "target image" (Step 206). This option may be provided to the user via a user interface displayed by the display device 21. The user is assumed to select this option, and the client machine 12 receives this input at step 208.

In response to this user input, the client machine identifies the set of (user defined) data 23 as the "target data" for the client machine 12 (step 210). As a result, upon the client machine 12 subsequently receiving generic access instructions (e.g., see step 216), the client machine 12 will respond to these instructions by accessing the set of data 23. Thus, the set of data 23 is the target data associated with the client machine 12. As shown, the set of data 23 is stored in the storage module 20 (step 211).

Next, the browser 18 transmits an appropriate request to the first server machine 14 for the first WEB content 32 (step 212). This may be in response to the user providing the browser 18 with appropriate input via the user input device 22 [The server 30 responds to the request from the browser 18 and transmits the first WEB content 32 to the browser 18].

Upon receiving the first WEB content 32, the browser 18 begins executing the instructions included in the first WEB content 32 (step 214). The WEB content 32 includes a set of commands that are for causing the executing device to display the image represented by the device's associated target data. The set of commands include one or more generic access instructions and additional commands for causing the device to display the image represented by the device's associated target data. The execution of the generic access instructions results in appropriate generic access requests being generated that cause the target data to be retrieved.

As shown in FIG. 2, the Client Machine 12 responds to the generic access instructions to retrieve the target access data by retrieving the image data 23 (step 216). This is by operation of the extension 24. That is to say, the extension 24 generates an appropriate set of (device specific) commands to retrieve the image data 23 in response to the generic access requests generated at step 214.

After the image data 23 is retrieved, the browser 18 causes the display device 21 to display the user defined image (step 218).

Figure 3:
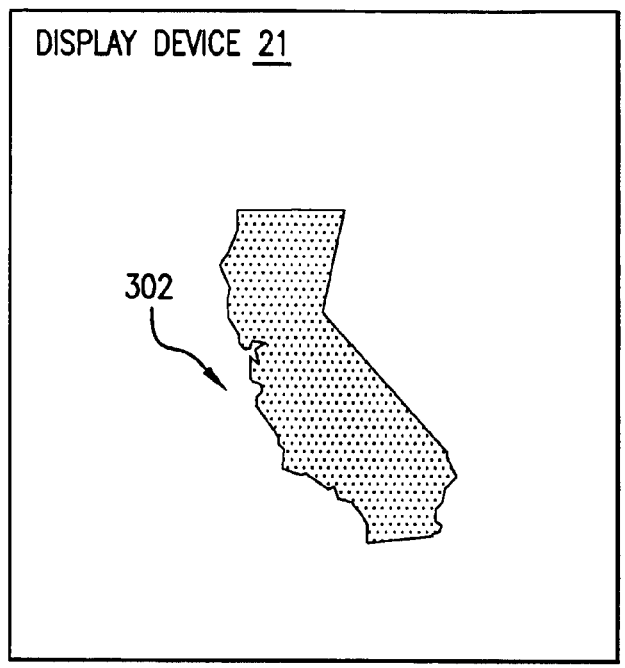
FIG. 3 illustrates an image that may be displayed by the client machine.
Figure 4:
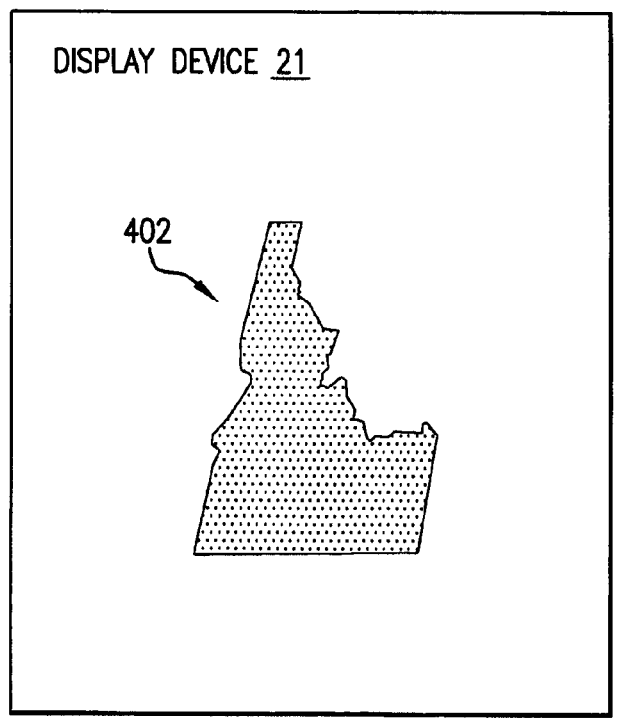
FIG. 4 illustrates a second image that may be displayed by the client machine.

FIG. 3 illustrates the image that is displayed in step 218 if the set of data 23 describes an image 302. The image 302 is an outline of the State of California. Alternatively, FIG. 4 illustrates the image that is displayed in step 218 if the set of data 23 describes an image 402. The image 402 is an outline of the State of Idaho.

Thus, from the foregoing, it can be seen that the first WEB content 32 enables a device to display a user defined image. Importantly, the image that is displayed is based on the target data associated with the client machine 12. Thus, it can be seen, if the first WEB content 32 were executed on a different machine, the machine would display a different image (assuming the target data for that machine describes a different image).

For additional illustration purposes, lets now assume that the second server machine 16 is a printer that has defined capabilities. In this example, the printer includes duplex and staple capabilities.

Figure 5:
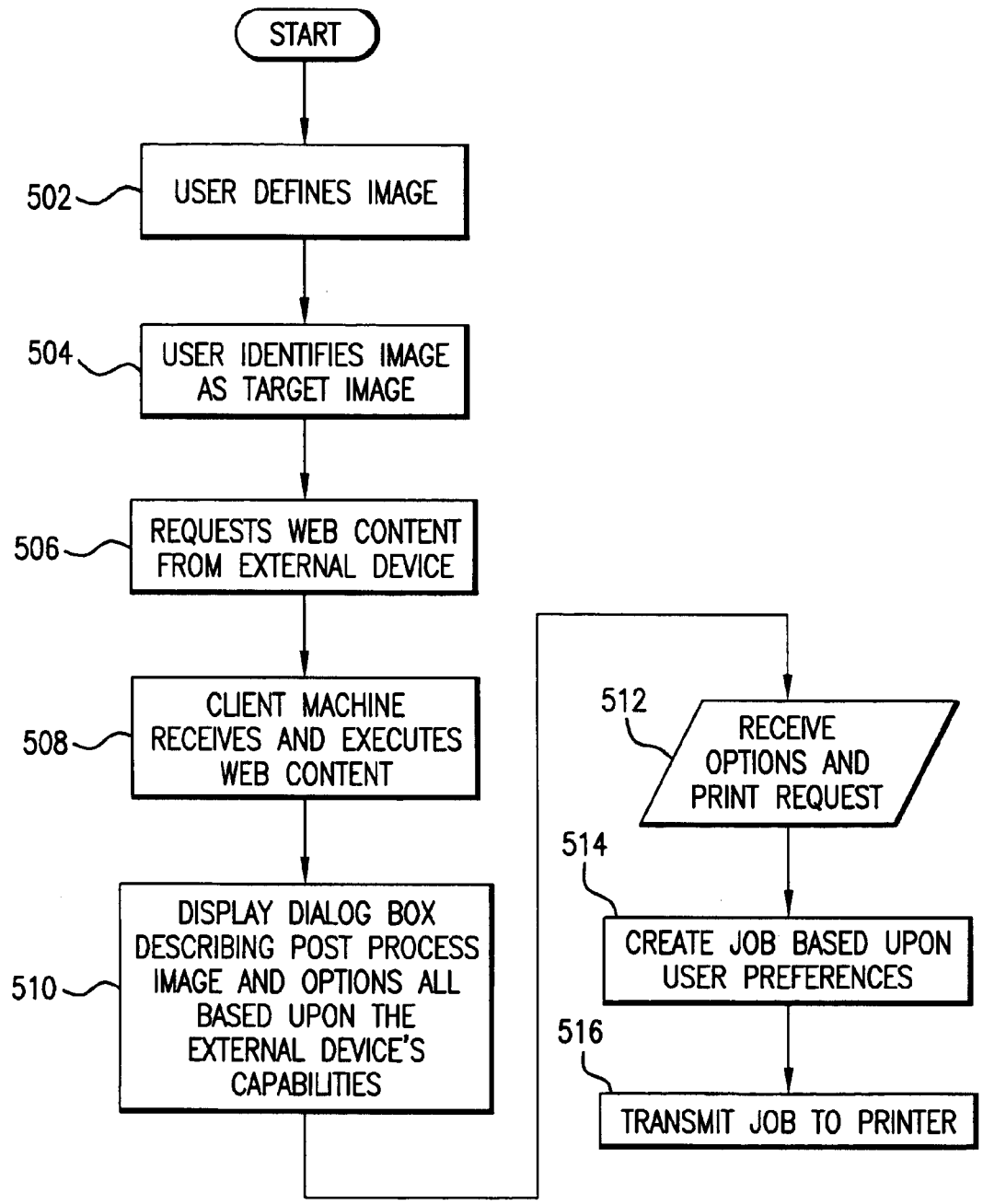
FIG. 5 is a flow diagram for illustrating an example of the operation of the client machine under certain assumption regarding the capabilities of a printer in the client-server system.

FIG. 5 is a flow diagram for illustrating an example of the operation of the client machine under this second assumption. Referring to FIG. 5, the user is assumed to define an image (step 502) and identify the image as a target image (step 504).

Next, the user inputs a request to the Browser 18 in order to cause the Browser 18 to transmit an appropriate request to the Second WEB server 34 for the Second WEB content 36. The Browser 18 receives this user input and responds by transmitting an appropriate request to the second server 34

(step 506). The second server 34 responds by transmitting the second WEB content 36 to the browser 18.

The Browser 18 receives and begins executing the second WEB content 36 at step 508.

Importantly, the second WEB content 36 includes generic access instructions for effecting the retrieval of the executing computer's target image. In addition, the WEB content 36 includes instructions to make use of the retrieved image to display a print dialog box that includes a post process image (i.e., a print preview image) of the target image (step 510). It is emphasized that the display of the print dialog box is by operation of the second WEB content 36 as opposed to the local operating system or the Browser 18.

Figure 6:
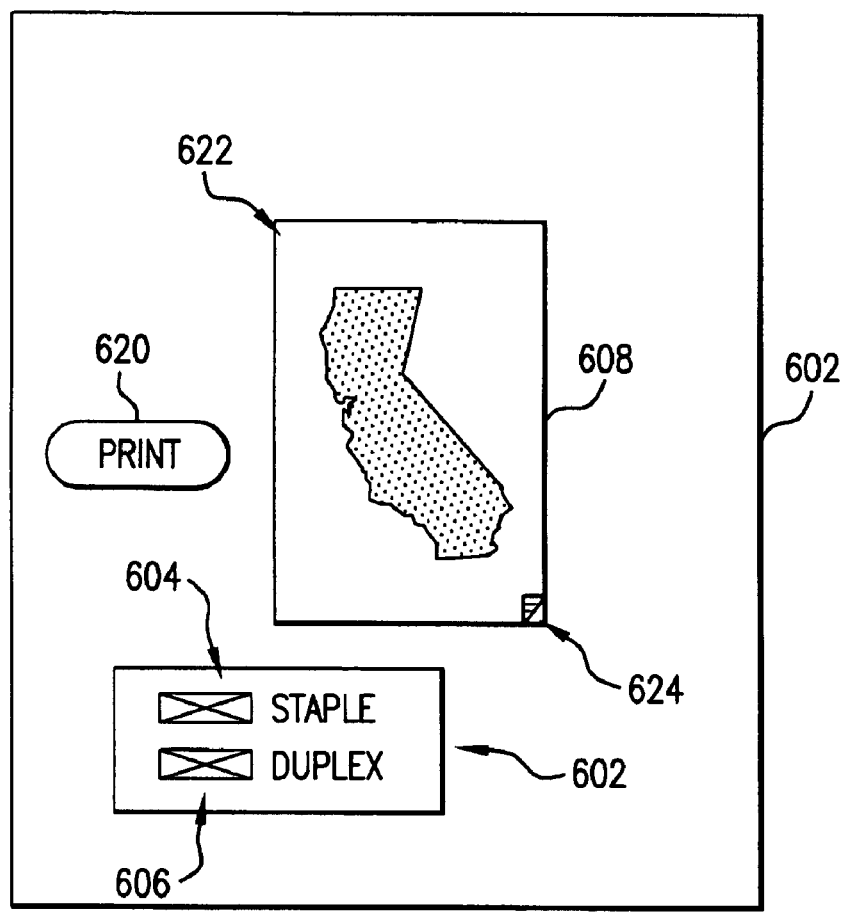
FIG. 6 illustrates a dialog box that may be displayed assuming the target image is the image shown in FIG. 3.

FIG. 6 illustrates a dialog box 602 that may be displayed at step 510 assuming the target image is the image 302 (i.e., the state of California). Importantly, it can be seen that the dialog box displays a set of selectable options 602 that are based upon the capabilities of the second server machine 16. The set of selectable options 602 include a staple option 604 and a duplex option 606.

The dialog box 602 also includes a print preview image 608. The print preview image 608 is based, in part, upon the target image and the options that were selected by the user. In this example, it is assumed that the target image is the image shown in FIG. 3. In addition, it is assumed that the user has selected the staple option 604 and the duplex option 606. Importantly, the print preview image 608 reflects these selections.

Referring again to FIG. 5, it is assumed that the user selects the print option 620. The browser 18 receives this input at step 512. In response, the second WEB content 36 causes the client machine 12 to generate a print job (step 514). The print job describes the target image and includes the appropriate commands to cause the server machine 16 to print the target image using duplex printing and a staple option. The second WEB content 36 further causes the client machine 12 to transmit the print job to the second server machine 16 to be printed. Importantly the Second WEB content 36 is further configured to transmit appropriate requests to the second server machine 16 in order to determine when the print job has been completely printed. These requests are transmitted on a periodic basis. When a response is received indicating the second server machine 16 has printed the print job, the second WEB content 36 causes the client machine 12 to display this information.

Thus, from the foregoing, it can be seen that the second WEB content 36 enables a device to display a dialog box that is includes selectable options. The options being based upon the capabilities of an external device. In this case, the second server 16. In addition, the WEB content 36 causes a device to display a post processing image using the target image. The post processing image is again based upon the capabilities of an external device as well. Further, the WEB content 36 displays the status information as the print job prints.

2. DESCRIPTION OF A SECOND ILLUSTRATIVE EMBODIMENT

Figure 7:
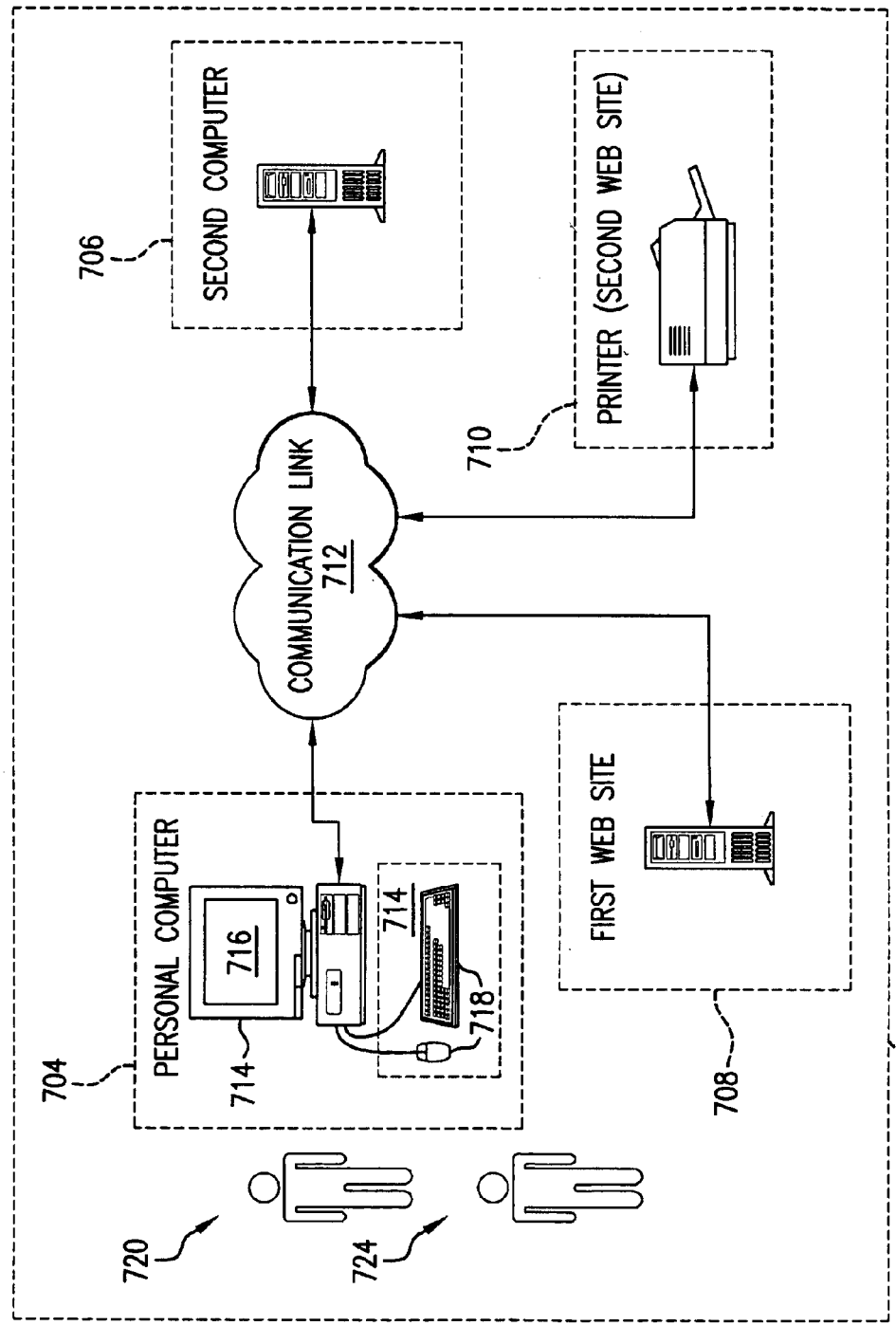
FIG. 7 illustrates an architectural diagram of a second client-server system that operates in accordance with a second embodiment of the invention.

FIG. 7 illustrates the general architecture of a computing system 702 that is in accordance with the invention. The computing system 702 includes a personal computer 704, a second computer 706, a first WEB site 708 and a printer 710. The printer 710 also functions as a WEB site.

All the devices depicted in FIG. 7 are able to communicate over a communication link 712. Furthermore, the communication link 712 may represent a network, a series of networks, a wireless network(s), the Internet, or any combination thereof.

The personal computer 704 may be any type of computing device that allows a user to interactively browse Web Sites and to perform the functions that are described below. For example, the personal computer 704 may be a personal computer that runs a local operating system, such as a version of MICROSOFT WINDOWS, NT, UNIX or LYNX, etc. As shown, the personal computer 704 includes a user interface 714. The user interface 714 includes a display monitor 716 and a user input device(s) 718 for allowing the user to provide input to the computer 704. In this example, the input devices 718 include a keyboard and a mouse. For purposes of the later discussion, it is noted that the personal computer 704 is used by multiple users, each having their own user profile. Two of these users, a first user 720, and a second user 724 are depicted. It is assumed that each one of these users has his/her own user profile information and identifier (i.e., user name) stored in the personal computer 704.

For purposes of the later discussion, a user presently logged in to the personal computer 704 at any point in time is referred to herein as the "active user". Thus, if the first user 720 is presently logged into the personal computer 704, that user is presently the "active user".

2. a.) System Wide Standard

It is important to note that the devices depicted in FIG. 7 are all in accordance with a system wide standard which is similar to the one described in the first embodiment. Accordingly, this second standard specifies a set of generic access requests that are intended to cause an executing computer to access a set of target data describing a target image. In this case, however, each user can have his/her own target image. The target data accessed in response to these requests at any point in time is the target data that is associated with the active user. FIGS. 8–11 is used to illustrate this concept further.

Figure 8:
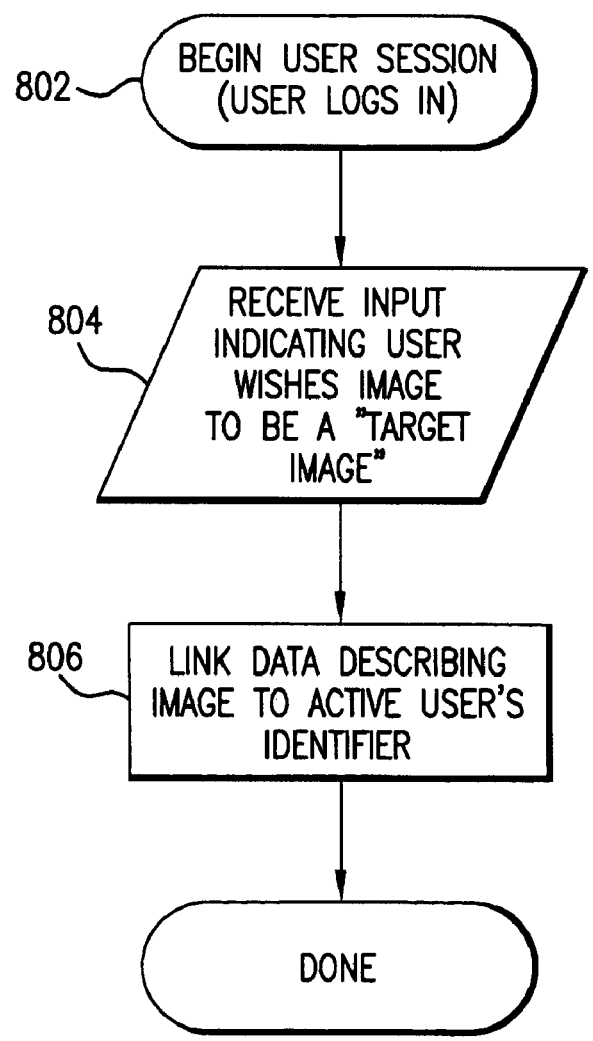
FIG. 8 is a flow diagram illustrating how a personal computer can be operated to identify and store a set of target data.

FIG. 8 is a flow diagram for showing, very generally, how the personal computer 704 can be operated to identify and store a set of target data. As indicated in FIG. 8, a user (e.g., the first user 720 or the second user 724) is assumed to log into to the personal computer 704 (step 802). The personal computer 704 responds in a conventional manner by retrieving the user's preferences and desktop configuration. In this manner, the user becomes the "active user".

Next, it is assumed that the active user provides input that he/she wishes a particular image to be a "target image". The computer 704 receives this input at step 804. In response, the computer 704 responds by identifying the data describing the image as "target data" (step 806). In addition, the computer 704 operates to link the target data to the identifier assigned to the active user 720 (step 806). In this manner, the target data becomes associated with the active user.

Figure 9:
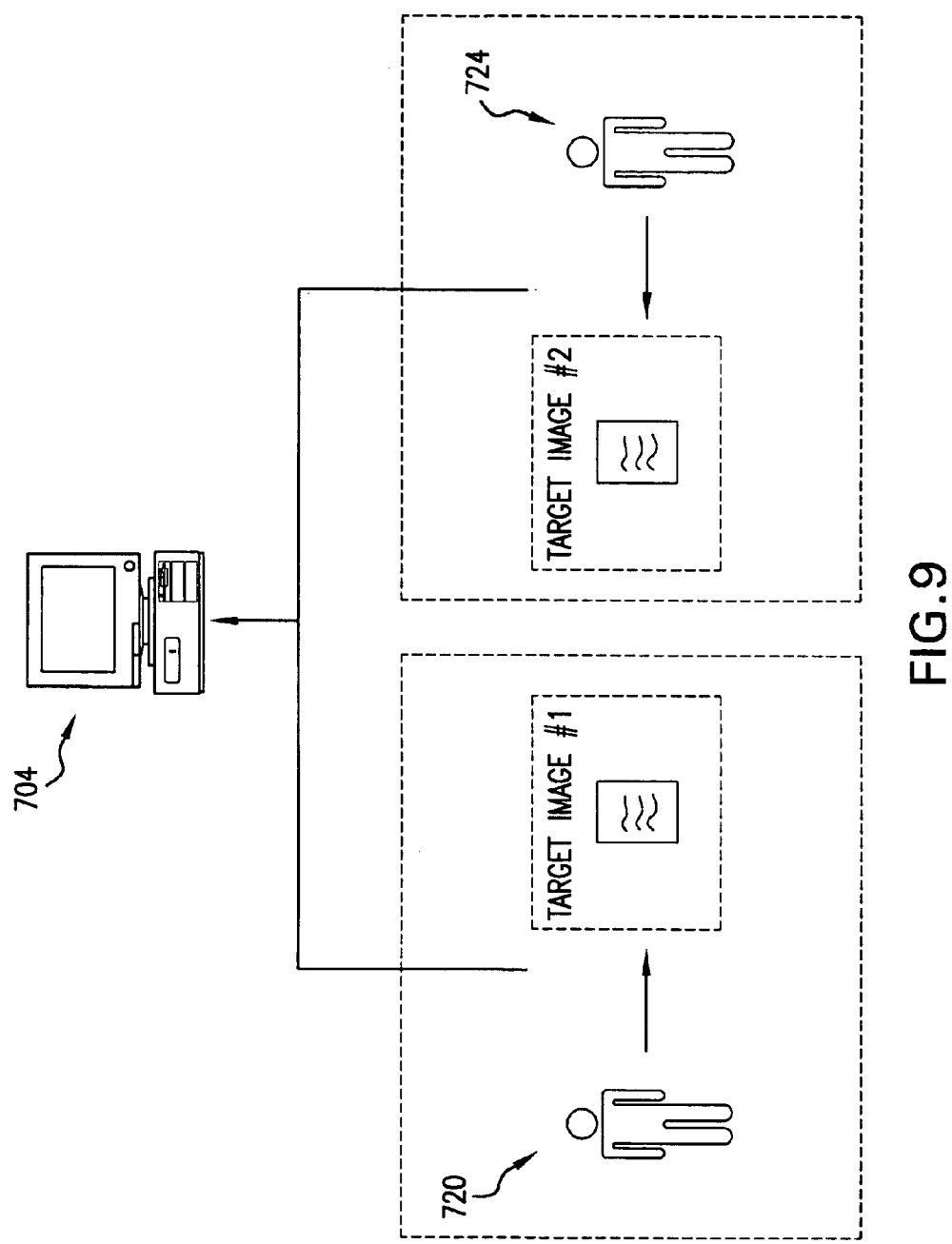
FIG. 9 is an abstract drawing of the personal computer under certain conditions.
Figure 10:
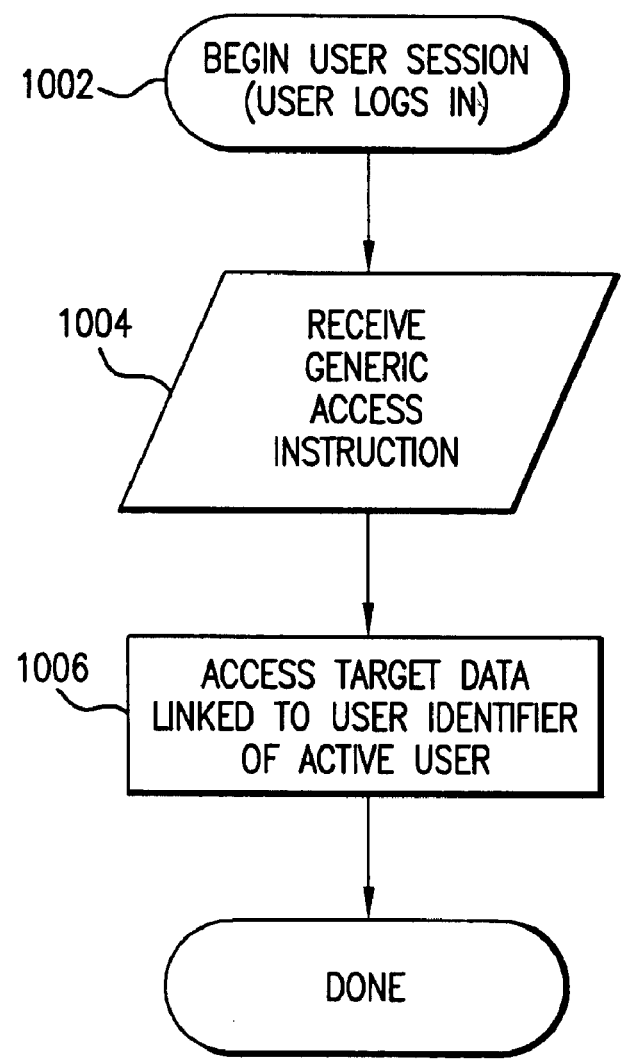
FIG. 10 illustrates very generally the operation of the personal computer in response to a generic access instruction, assuming the conditions depicted in FIG. 9.

Now consider FIG. 9 and FIG. 10. FIG. 9 is an abstract drawing of the personal computer 704 under the following scenario. First, it is assumed that the first user 720 has previously interacted with the personal computer to identify a first target image (target image #1). As a result, the data representing this image has been identified, by the personal computer 704, as target data (target data #1). Additionally, the target data #1 is linked to the identifier assigned to the first user 720.

It is further assumed that the second user 724 has also previously interacted with the personal computer 704 and has identified a second target image (target image #2). As a result, the data describing this image is also identified as target data (target data #2). This second set of data, however, is linked to the identifier assigned to the second user 724.

FIG. 10 illustrates very generally the operation of the personal computer 704 in response to a generic access instruction, assuming the scenario depicted in FIG. 9. As illustrated in FIG. 9, a user is assumed to log in to the personal computer 704 (step 1002). As a result, that user becomes the "active user". Next, the computer 704 is assumed to execute a generic access 1 instruction (step 1004). In response, the personal computer 704 accesses the target data that is linked to the active user's identifier (step 1006).

Thus, if the first user 720 had logged into the personal computer 704 at step 1002, the personal computer 704 would respond to the generic access instruction by accessing the target data #1. Conversely, if the second user 724 had logged into the personal computer 704 at step 1002, the personal computer 704 would respond to the same generic access instruction in a different manner. That is, the personal computer 704 would access the target data #2.

2. b.) General Description of the Hardware and Software Components

Lets now consider some of the hardware and software components in each one of the devices depicted in FIG. 7.

Figure 11:
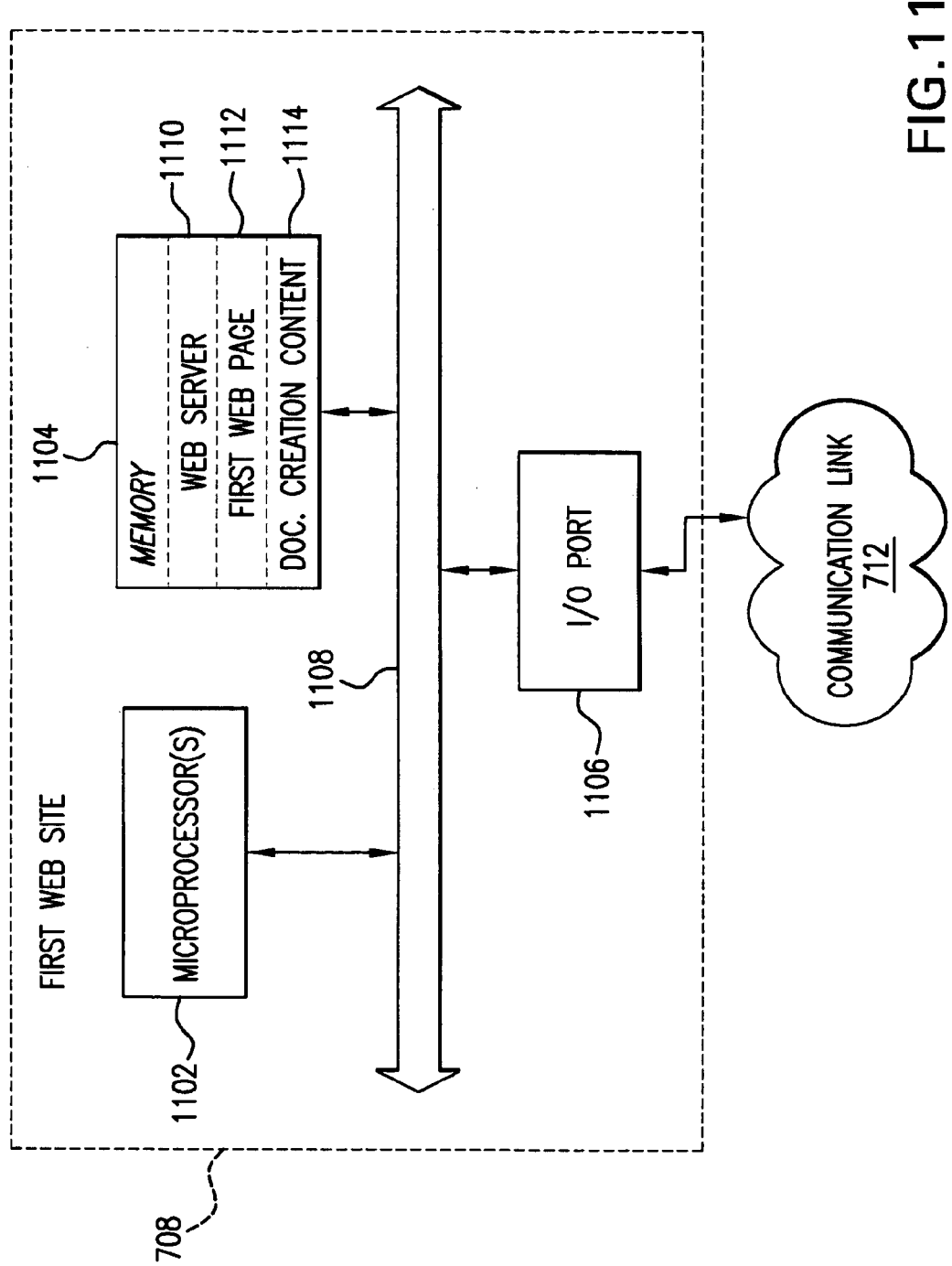
FIG. 11 is a high level block diagram of a first WEB site in the second client-server system.

FIG. 11 is a high level block diagram of the first WEB site 708. As shown, the first WEB Site 708 includes a processor 1102, a memory 1104, and an input/output (I/O) port 1106. All these components are connected by one or more local interfaces 1108. The I/O port 1106 links the WEB site 708 to the communication link 712. The processor 1102 is used to execute the first WEB Server 1110 which is shown stored in the memory 1104.

Also stored in the memory 1104 is a first WEB page 1112 and "document creation WEB content" 1114. Both the first WEB page 1112 and the document creation WEB content 1114 are assigned a URL.

As will be described in greater detail below, the document creation WEB content 1114 is used to provide a "document creation service" to external devices. Importantly for this discussion, this content includes generic access instructions that are in accordance with the system wide standard described in section (2.a) of this document. When executed, these instructions result in generic access requests being generated in order to access a set of target data. As mentioned above, generic access instructions are instructions that do not include the location of the target data itself. The "generic access requests" generated from these instructions also do not include the location of the target data.

Figure 12:
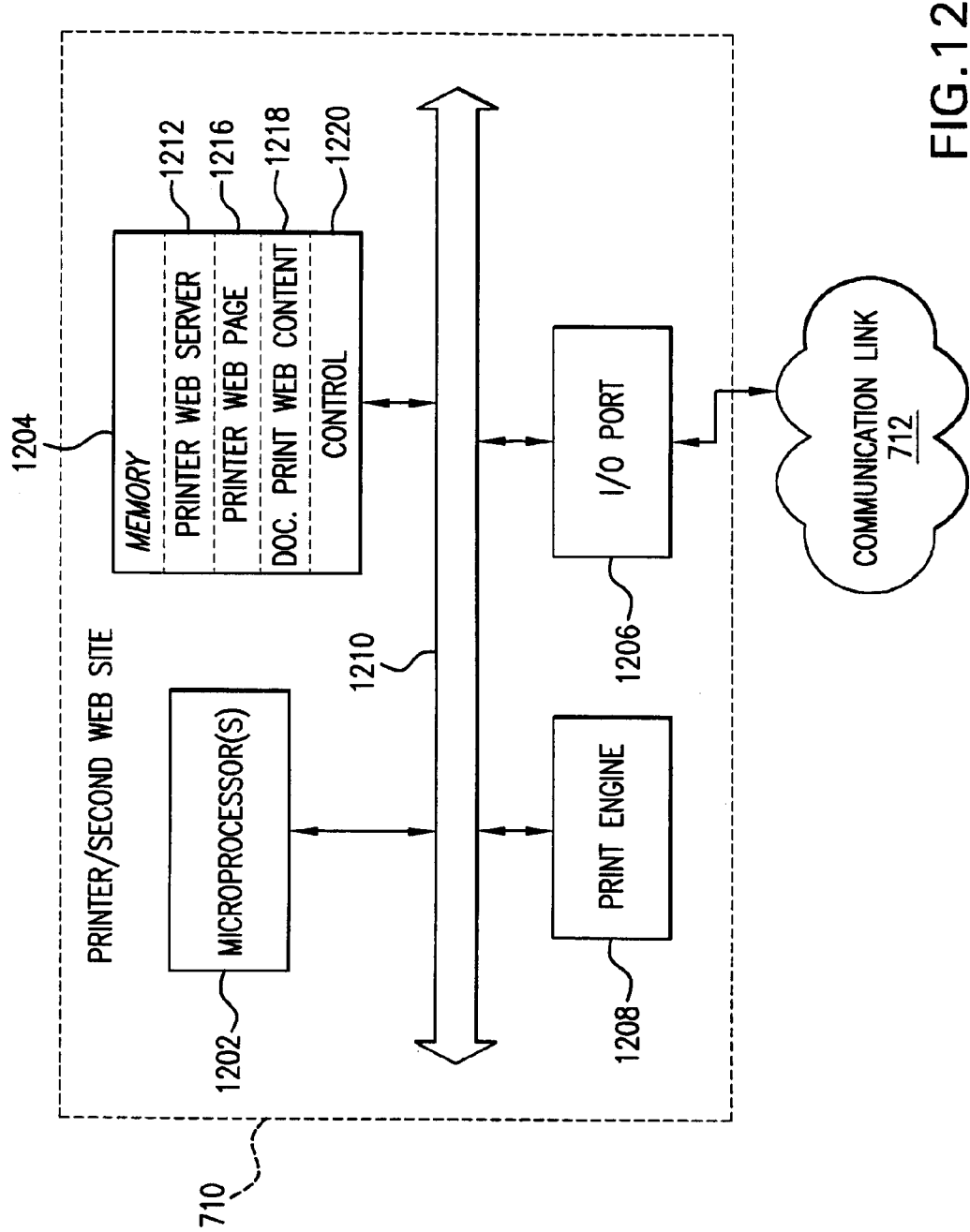
FIG. 12 is a high level block diagram of a printer in the second client-server system.

FIG. 12 is a high level block diagram of the printer 710. As shown, the printer 710 includes a processor 1202, a memory 1204, an I/O port 1206, and a print engine 1208. All these components are connected by one or more local interfaces 1210. The I/O port 1206 links the printer 710 to the communication link 712. The print engine 1208 includes the necessary hardware and firmware to print a document.

The processor 1202 is used to execute the print WEB Server 1212 and the printer control program 1222 which is shown stored in the memory 1204. Also stored in the memory 1204 is a WEB page 1216 and "Document Print WEB content" 1220. Both the WEB page 1216 and the Document print WEB content 1220 are assigned a URL.

As will be described in detail below, the document print content is used to provide a document printing service to external devices. Importantly for this discussion, this content includes generic access instructions that are also in accordance with the system wide standard described in section (2.a). When executed, these instructions results in generic access requests being generated.

Figure 13:
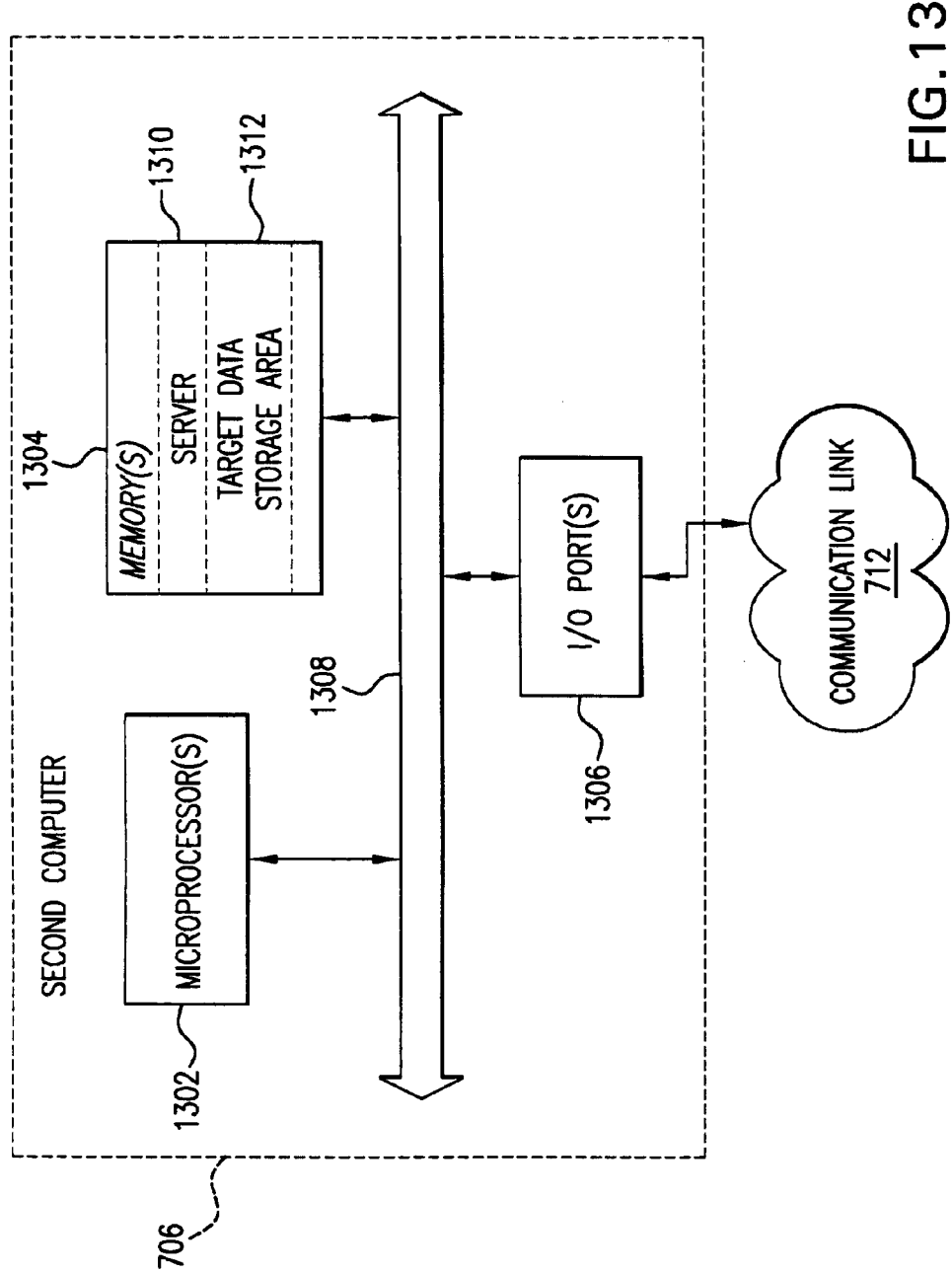
FIG. 13 is a high level block diagram of a second computer in the second client-server system.

FIG. 13 is a high level block diagram of the second Computer 706. As shown, the second computer 706 includes a processor 1302, a memory 1304, and an input/output (I/O) port 1306. All these components are connected by one or more local interfaces 1308. The I/O port 1306 links the second computer 1306 to the communication link 712.

The processor 1302 is used to execute the Server 1310 shown stored in the memory 1304. As will be discussed in greater detail below, the memory 1304 includes a reserved storage area 1312 for storing target data that is associated with users of the personal computer 704.

Figure 14:
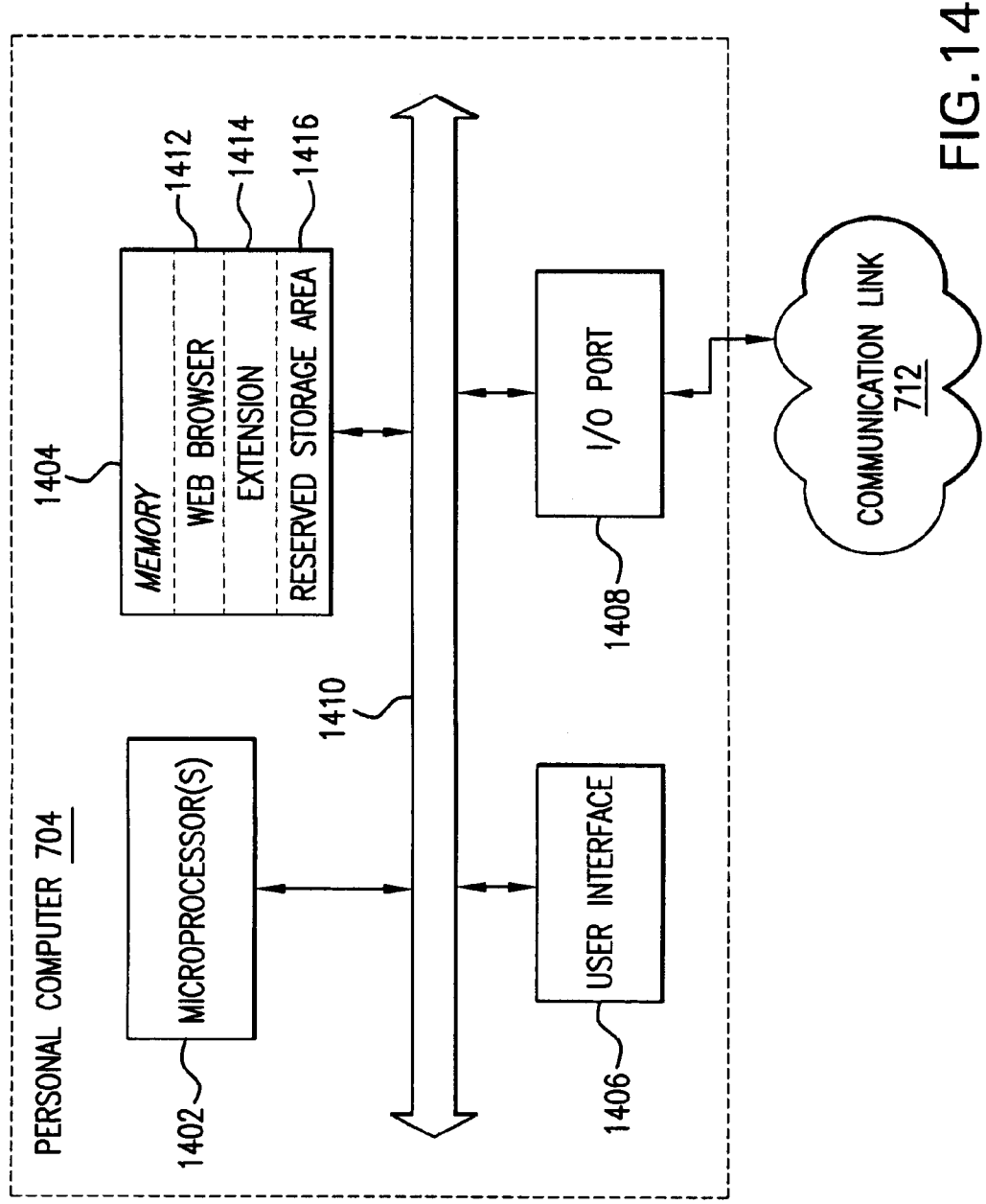
FIG. 14 is a high level diagram of a personal computer in the second client-server system.

FIG. 14 is a high level diagram of the of personal computer 704. As shown, the personal computer 704 includes a processor 1402, a memory 1404 and an input/output (I/O) port 1408. All these components are connected by one or more local interfaces 1410. The I/O port 1408 links the second computer 706 to the communication link 712.

As shown, the memory 1404 includes a reserved storage area 1416 and a WEB Browser 1412. The WEB Browser 1412 includes an extension component (extension) 1414. The processor 1402 is used to execute the WEB Browser 1412.

Importantly, the extension 1414 is configured to respond to generic access requests (generated by downloaded WEB Content) by accessing the set of target data which is linked to the current active user. It will be clear to a person skilled the art that the extension 1414 may be an application programming interface (API) and the generic access requests can be API function calls. It is important to note, however, that the there are other ways to implement the functionality provided by the extension 1414. The present invention is not limited to any one way.

It is also noted that in each of the computer's just described, the memory shown may include both volatile and nonvolatile components. Volatile components are those that do not retain data upon loss of power. Non-volatile components are those that retain data upon a loss of power.

Thus, each of the memories shown in FIGS. 7–14 may comprise, for example, random access memory (RAM), read-only memory (ROM), hard disk drives, floppy disks accessed via an associated floppy disk drive, compact disk(s) accessed via a compact disk drive, magnet tape(s) accessed via an appropriate tape drive, and/or other memory components (currently known in the art, or yet to be developed), or a combination of any two or more memory components.

In addition, it is also noted that in each of the devices just described, the processor shown may include one or more than one microprocessors. Furthermore, the local interface in each device may include, for example, one or more data buses and accompanying control buses.

2. c.) System Communication

Figure 15:
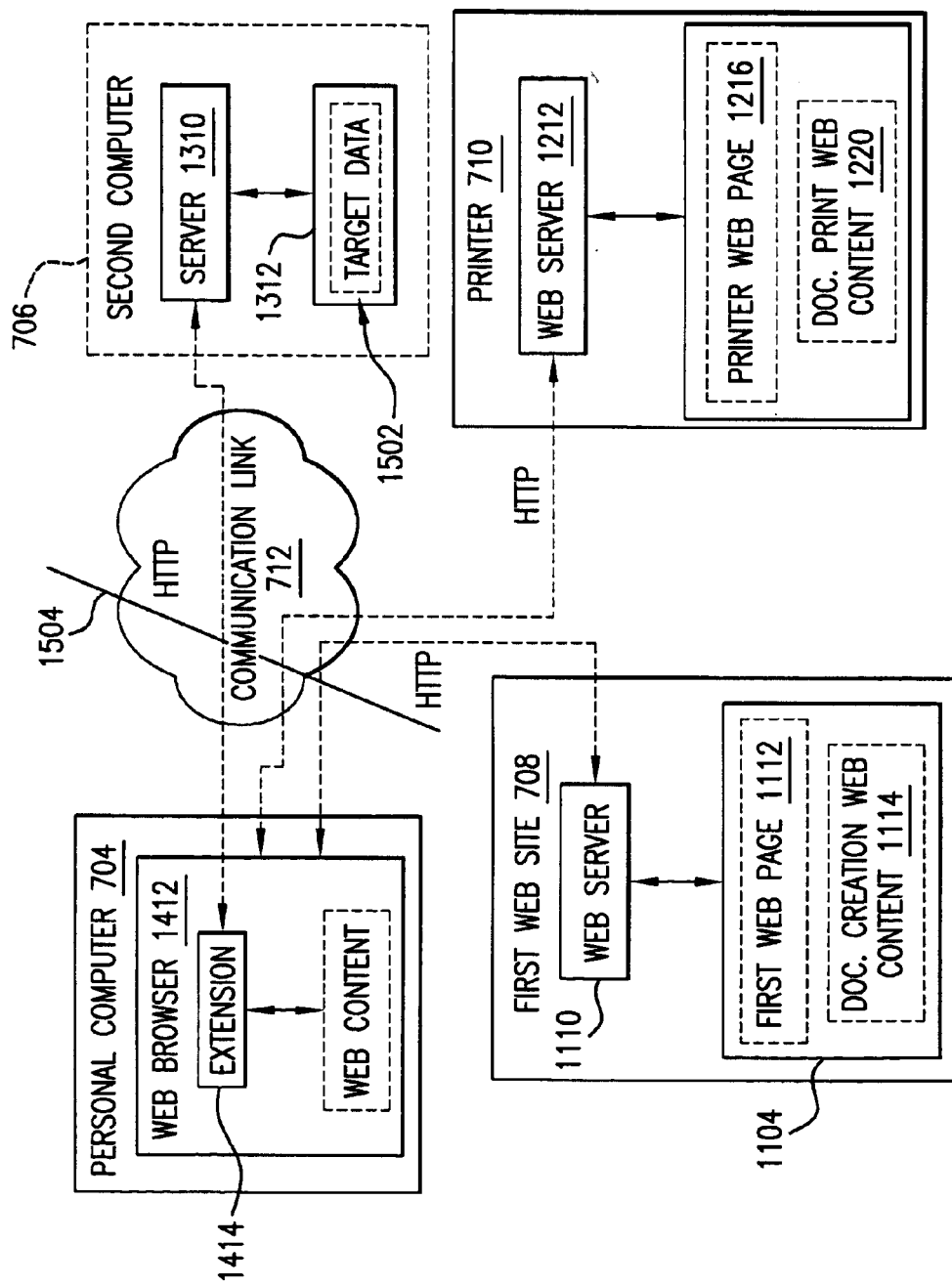
FIG. 15 illustrates how the various software components in the client server system can communicate.

FIG. 15 illustrates how the various software components can communicate over the communication link 712. To illustrate an aspect of the invention, it will be assumed that the personal computer 704 must communicate to the other devices shown through a conventional firewall 1504. The firewall 1504 is used to filter out unwanted communication packets in a conventional manner. Thus, requests may be made by the personal computer 704 to external devices located on the other side of the firewall 1504 and responses to these requests from the external devices are typically allowed. Communications, however, initiated by these external devices to the personal computer 704 are not permitted.

The firewall 1504, however, includes a conventional proxy server (hereafter "firewall proxy") that allows the personal computer 704 to pass HTTP requests to the WEB server 1110, the Server 1310 and the WEB server 1212. As will be seen, by using the HTTP protocol to traverse the firewall 1504 in this manner, the personal computer 704 is able to make use of the services provided by the first WEB site 708 and the printer 710. In addition, the personal computer 704 is able to store target data in the memory 1304 located in the second computer 706. It is important to note that in other embodiments of the invention other communication protocols (either now existing or yet to be developed) can be used.

In response to user input, the WEB browser 1412 can request the first WEB page 1112 as well as the Document creation WEB content 1114 by transmitting appropriate HTTP requests (via the proxy) to the WEB server 1110. Similarly, the WEB browser 1412, can request the printer WEB page 1216 as well as the document print WEB content 1220 received from the WEB server 1212. The WEB browser 1412 can also communicate one or more sets of data (via the proxy) to the server 1310 and can retrieve this data.

2.d.) Document Creation Service

Figure 16:
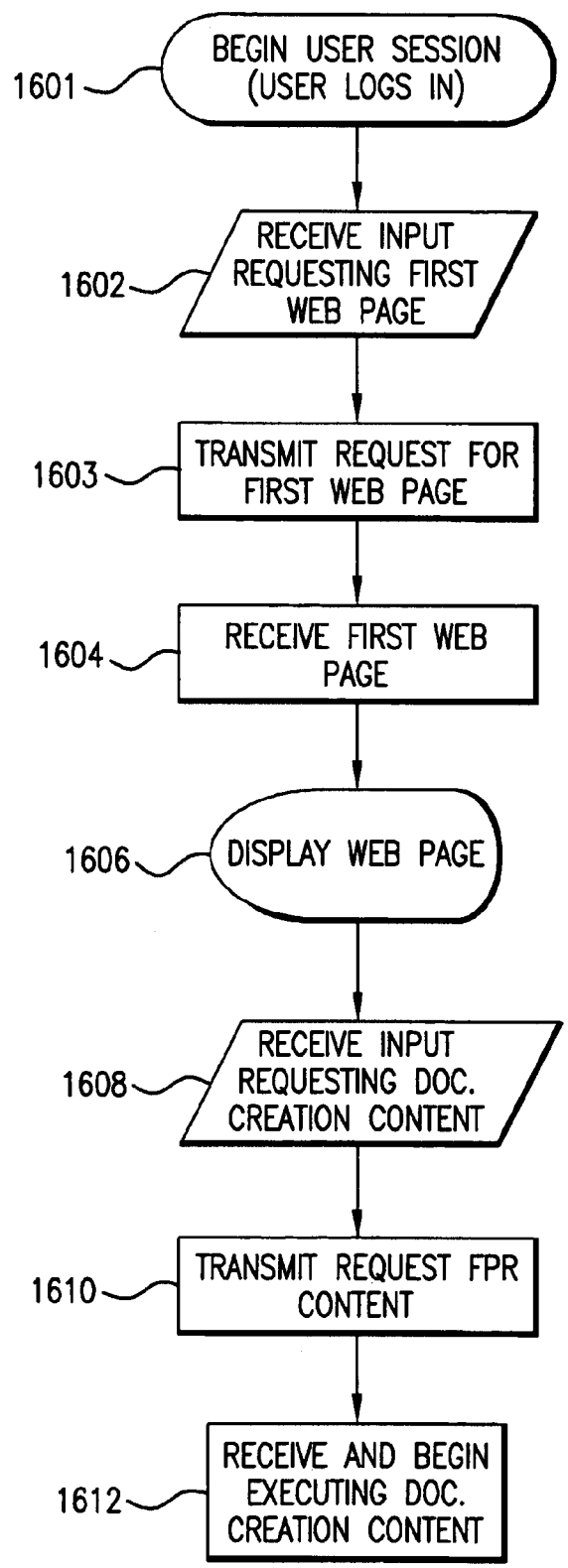
FIG. 16 is a flow diagram illustrating how the personal computer can download first WEB content that allows a user to create a document.
Figure 17:
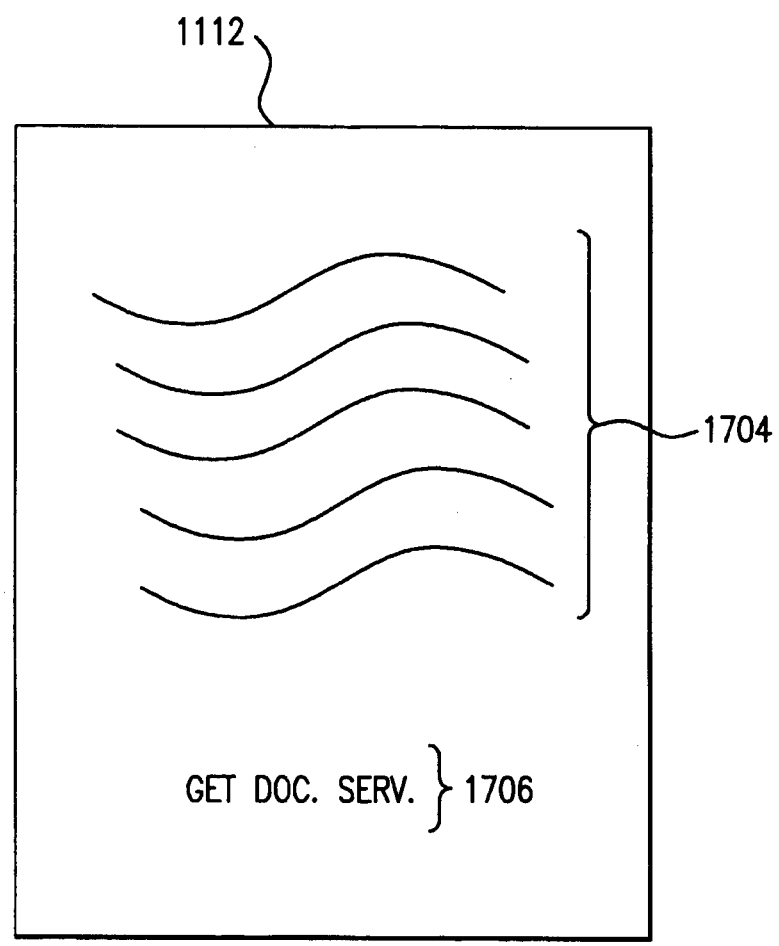
FIG. 17 illustrates a first WEB Page that includes a hyperlink to the first WEB content.
Figure 18:
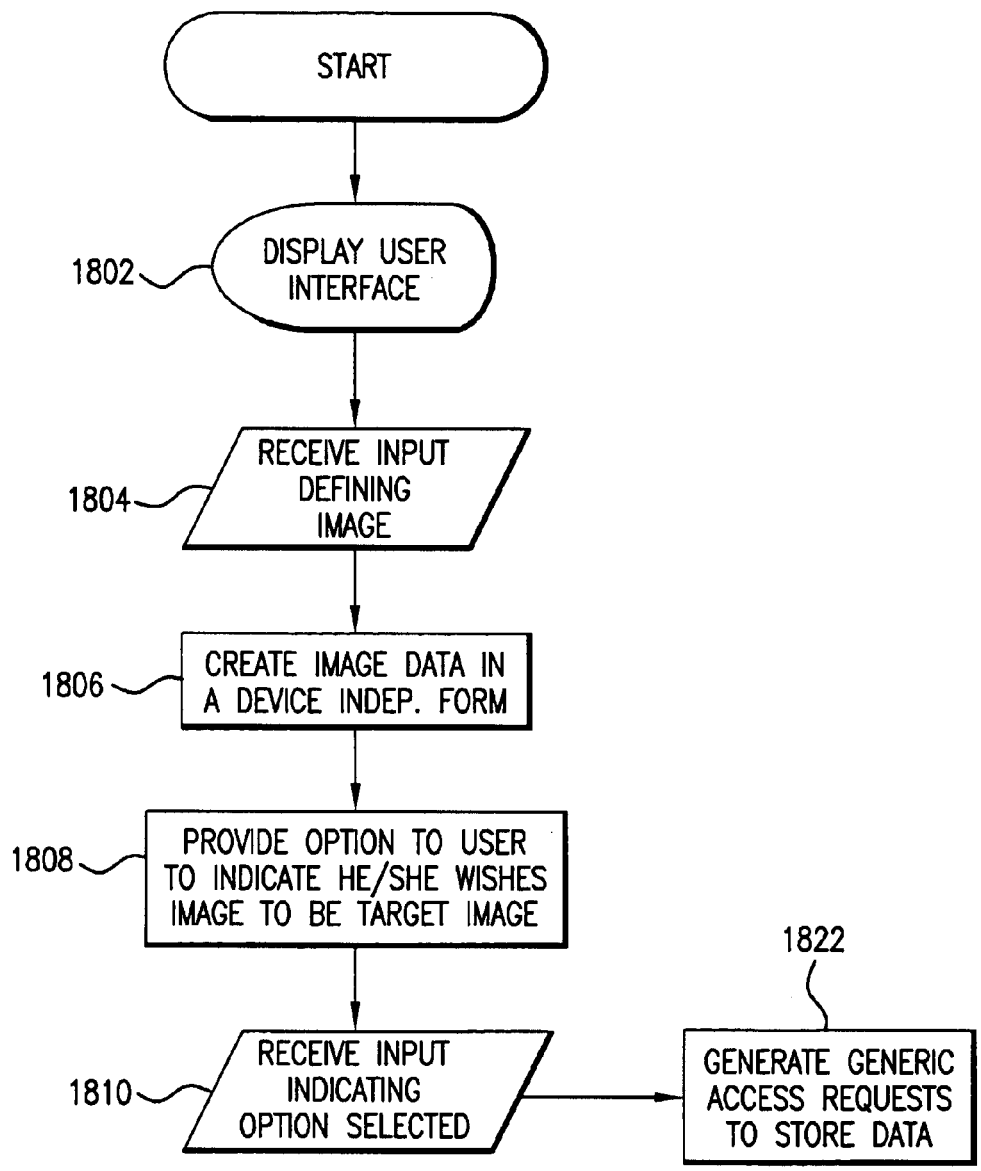
FIG. 18 is a flow diagram illustrating the execution of the first WEB content.

FIGS. 16–18 are used to illustrate how a user of the personal computer 704 can make use of the document creation service provided by the first WEB site 708.

Referring first to FIG. 16, a user logs into the personal computer 704 and begins a user session (step 1601). In this manner, the user becomes an active user.

Next, the user inputs an appropriate URL for the First WEB page 1112. The WEB Browser 1412 receives this input at step 1602 and in response transmits (via the firewall proxy) an appropriate request for the page to the WEB server 1110 (step 1603).

The WEB server 1110 receives the request and responds by transmitting the first WEB page 1112 to the WEB Browser 1412 (via the firewall proxy).

The WEB Browser 1412 receives this response from the WEB server 1110 at step 1604 and displays the received first WEB page 1112 at step 1606.

FIG. 17 illustrates the first WEB page 1112 as displayed by the browser 1412. Referring briefly to FIG. 17, the first WEB Page 1112 includes a text portion 1704 and a "get document service" hyperlink 1706. The text portion 1704 may include information regarding the document creation service provided by the first WEB Site 708. The hyperlink 1706 is formatted such that, when selected by a user, the WEB Browser 1412 transmits an appropriate request to the WEB server 1110 for the Document Creation WEB content 1114. In other embodiments, the first WEB Page 1112 may also display a cost to use the service as well as provide a means for the user to enter payment information (e.g., credit card information) to pay for the service.

Referring again to FIG. 16, it is assumed the user selects the get document service hyperlink 1706 and the browser 1412 receives this input at step 1608. In response to this input, the browser 1412 transmits an appropriate request to the Web Sever 1110 (via the firewall proxy) for the Document creation WEB content 1114 (step 1610). The browser 1412 receives and begins executing the WEB content 1114 at step 1612.

FIG. 18 illustrates the operation of the Document creation WEB content 1114 while being executed at step 1612. Referring now to FIG. 18, the content 1114 first causes the display device 716 to display a user interface (step 1802). The user interface accepts input from a user (via the input devices 714) so as to allow the user to define an image.

The WEB content 1114 receives these inputs at step 1804 and creates a set of data describing the image (step 1806). In this example, the data is created in a file format that is device independent. That is to say, the data represents the image in a manner that is independent of the WEB content, the local operating system and hardware used to generate it. One example of such a format is the format known as "PDF" (Portable Document Format).

Next, the WEB content 1114 provides a means for the user to indicate whether he/she wishes the image defined at step 1804 to be saved as a "target image" (step 1808). For example, the user interface displayed at step 1802 may include one or more selectable options or a pull down menu for providing a user a means to indicate this desire.

The WEB content 1114 is assumed to receive this indication at step 1810. In response to this input, the WEB content 1114 generates generic access requests in order to cause the data generated at step 1806 to be stored (step 1822). The Extension 1414 is responsible for responding to these requests.

Figure 19:
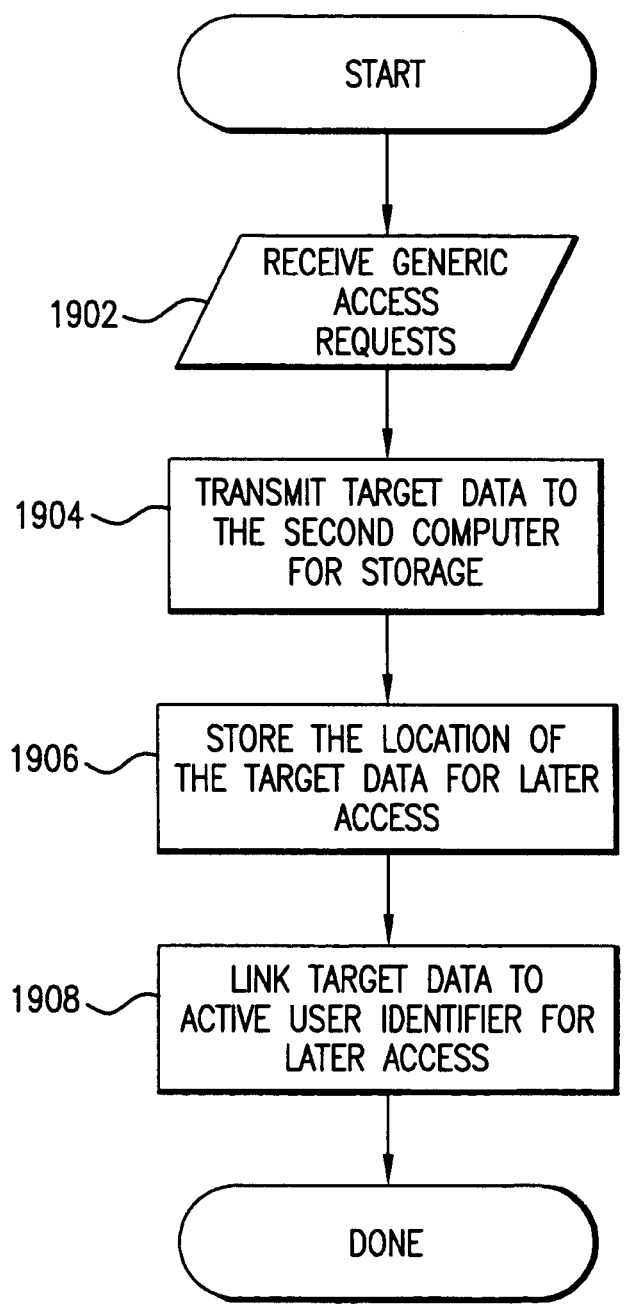
FIG. 19 is a flow diagram illustrating the operation of an extension component in the personal computer.

FIG. 19 is a flow diagram for illustrating the operation of the extension 1414 to respond to the generic access requests generated at step 1822. Referring now to FIG. 19, the extension 1414 receives the generic access requests at step 1902. In response, the extension 1414 causes the target data created at step 1806 to be stored in the reserved storage area 1312 of the second computer 706 (step 1904). This is accomplished by the extension 1414 communicating the target data over the communication link 712 to the server 1310. It is noted that because the HTTP protocol is used, the extension 1414 is able to communicate the target data through the firewall 1504.

The server 1310 responds by storing the target data in the reserved storage area 1312. It will be assumed that the first target data 1502 represents this target data.

In addition to communicating the target data 1502 to the server 1310, the extension 1414 (preferably) also stores the location of the first target data 1502 so that the data can later be accessed (step 1906) and links this location to the active user's identifier (step 1908).

2.e.) Printing Service

FIGS. 20–26 are used to illustrate how a user of the personal computer 704 can make use of the printing service provided by the printer 710. In this section, it will be assumed that the conditions depicted in FIG. 20A exist.

As indicated in FIG. 20 A, the first user 720 has made use of the document creation service to identify a target image (target image #3). The data (target data #3) that describes this image is stored in the internal memory of the second computer 706. Furthermore, the second user 724 has also made use of the document creation service to define a target image (target image #4). The data (target data #4) that describes this second image which is also stored in the internal memory of the second computer 706.

Figure 20A:
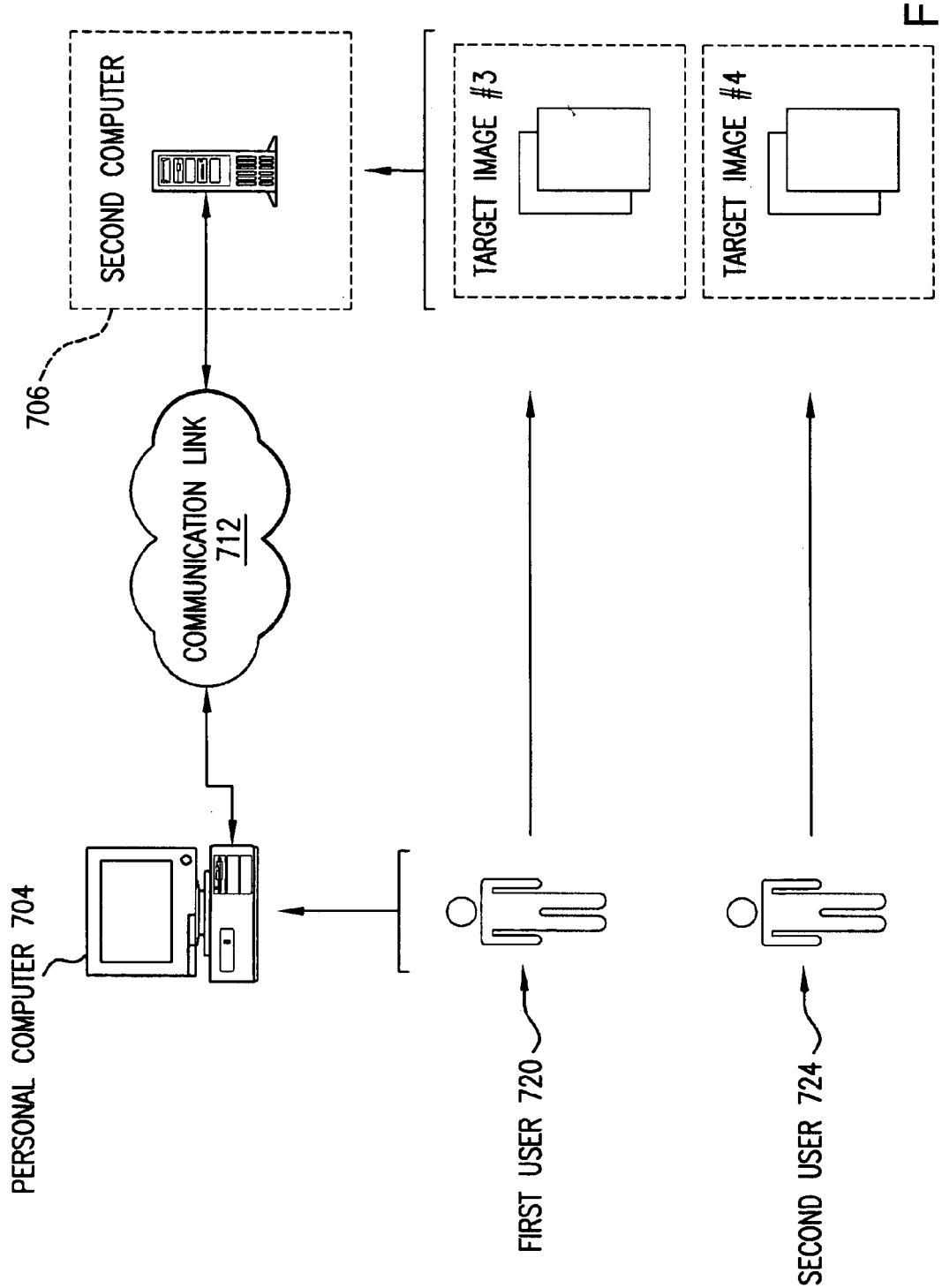
FIG. 20A is used to illustrate, in abstract form, a set of conditions.
Figure 20B:
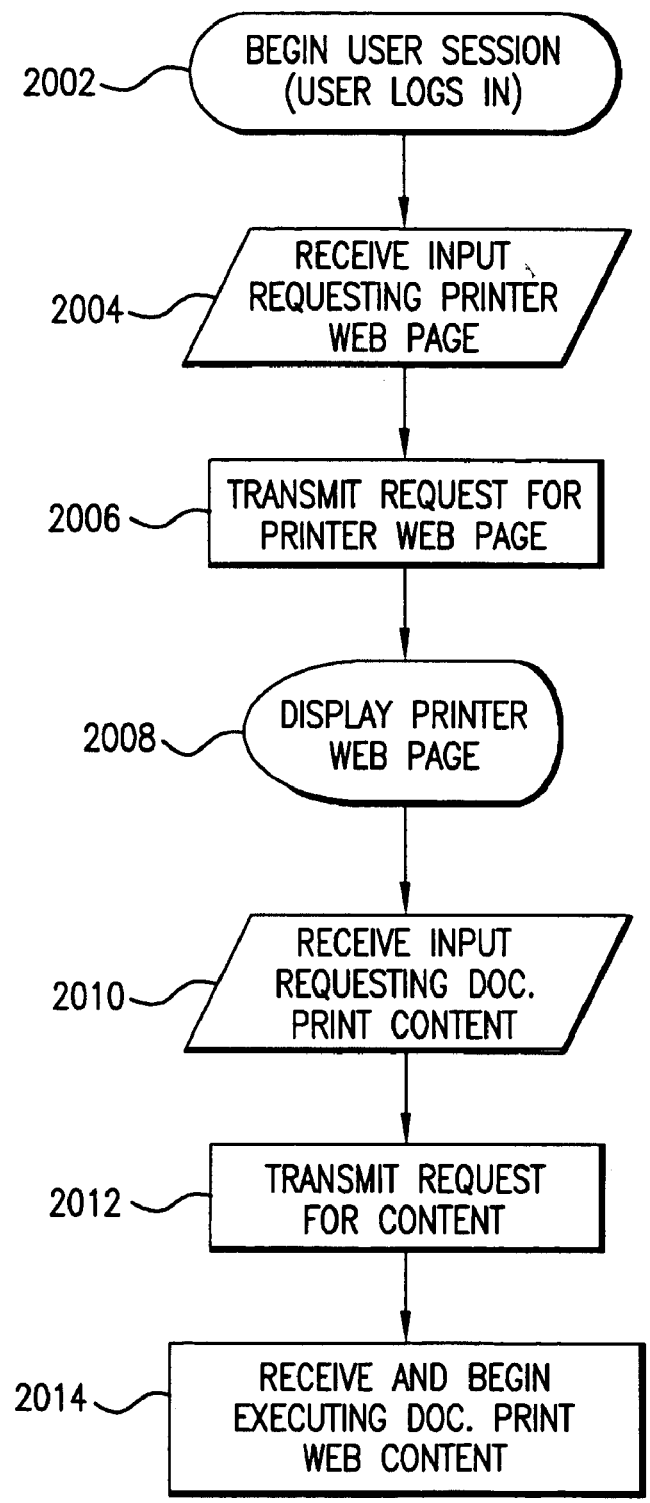
FIG. 20B is a flow diagram illustrating how the personal computer can download second WEB content that allows a user to print a document.

Referring now to FIG. 20B, one of the two users logs into the personal computer 704 (step 2002) and executes the WEB browser 1412. The user is then assumed to provide the URL of the printer WEB page 1216. The WEB browser 18 receives this input at step 2004.

In response to this input, the Browser 1412 transmits an appropriate request to the WEB Server 1212 for the Printer WEB page 1216.

The WEB server 1212 receives this input and responds by transmitting the printer WEB page 1216 to the WEB Browser 1412.

The WEB Browser 1412 receives and displays the printer WEB page 1216 at step 2008.

Figure 21:
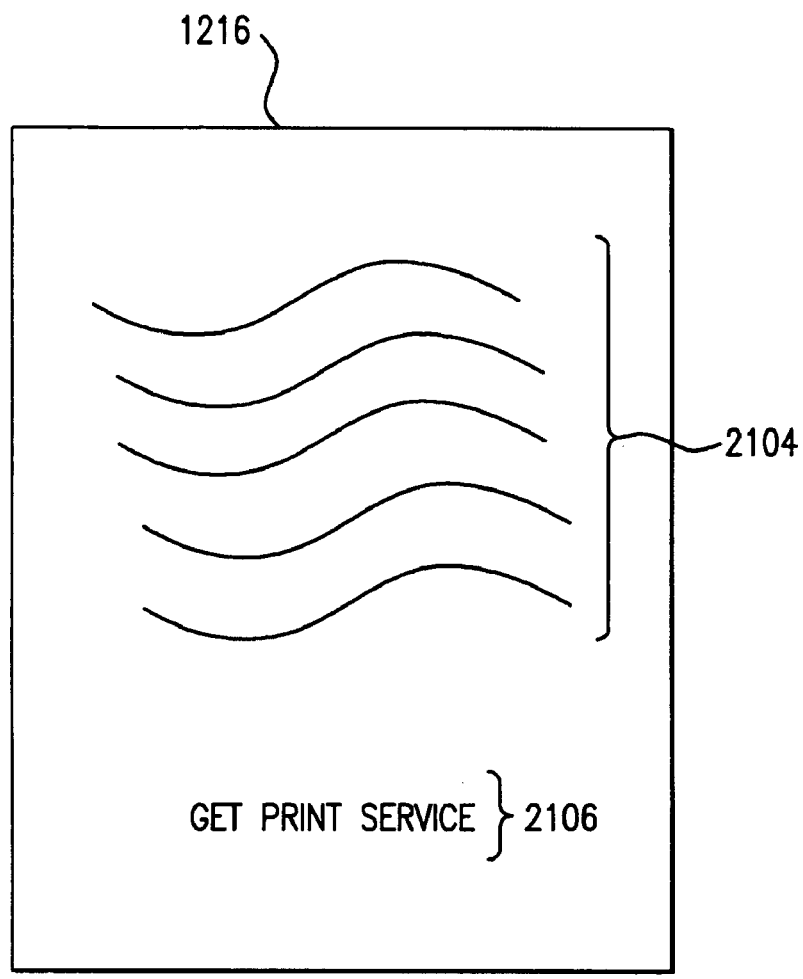
FIG. 21 illustrates a second WEB Page that includes a hyperlink that to the second WEB content.

FIG. 21 illustrates the printer WEB page 1216 as displayed by a browser. Referring briefly to FIG. 21, the printer WEB page 1216 includes a text portion 2104 and a "get document print service" hyperlink 2106. The text portion 2104 may include information regarding the document printing service provided by the printer 710. The hyperlink 2106 is formatted such that, when selected by a user, the WEB Browser 1412 transmits an appropriate request to the WEB server 1212 for the Document print WEB content 1220. In other embodiments, the printer WEB page 1216 may also display a cost to use the printing service and may provide the user with a means to enter payment information to make use of the service.

Referring again to FIG. 20B, it is assumed that the user selects the get print service hyperlink. The WEB Browser 1412 receives this input at step 2010 and in response transmits a request for the WEB content 1220 to the WEB server 1212.

The WEB server 1212 receives this input and responds by transmitting the Document Print WEB content 1220 to the WEB browser 1412.

The WEB Browser 1412 receives the print WEB content 1220 and begins executing it at step 2014.

Figure 22A:
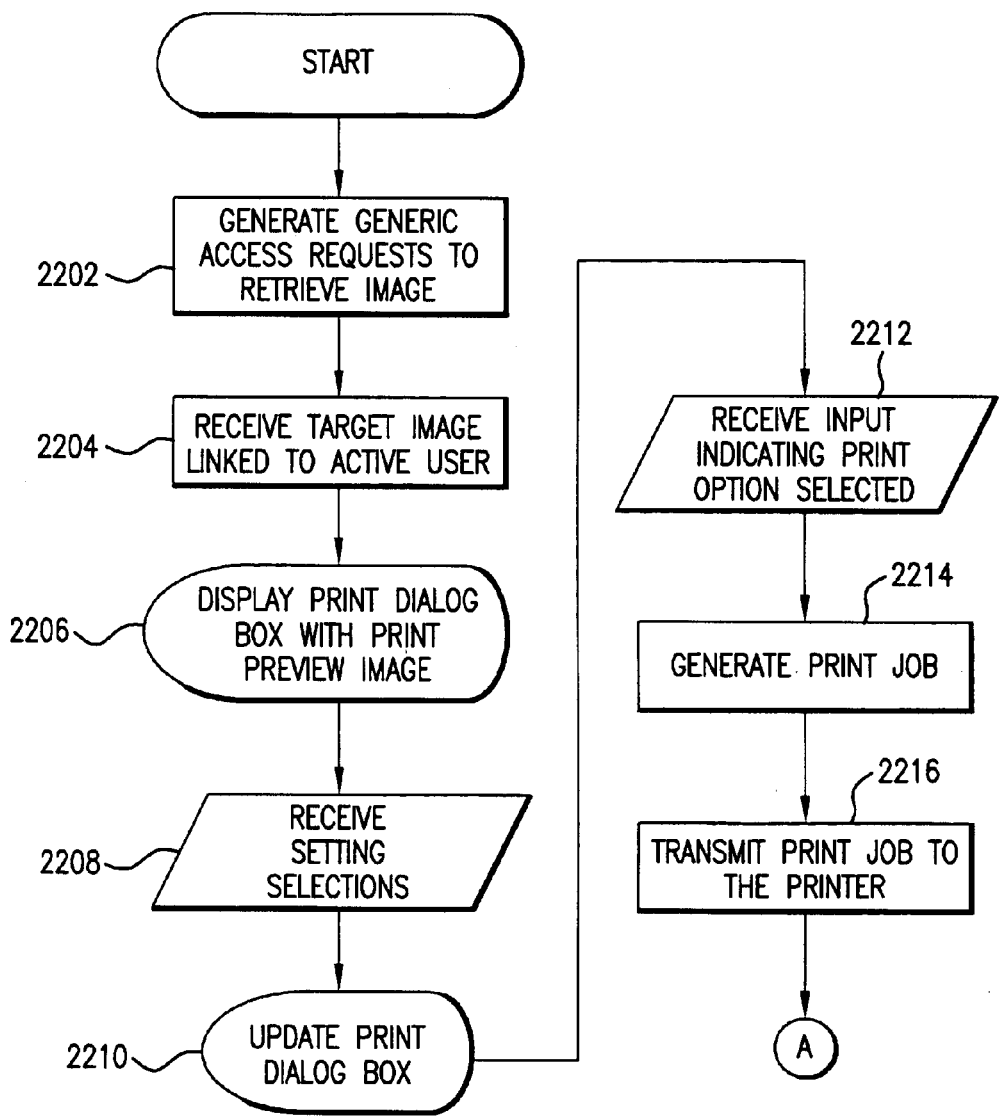
FIG. 22A and FIG. 22B illustrate the execution of the second WEB content.
Figure 22B:
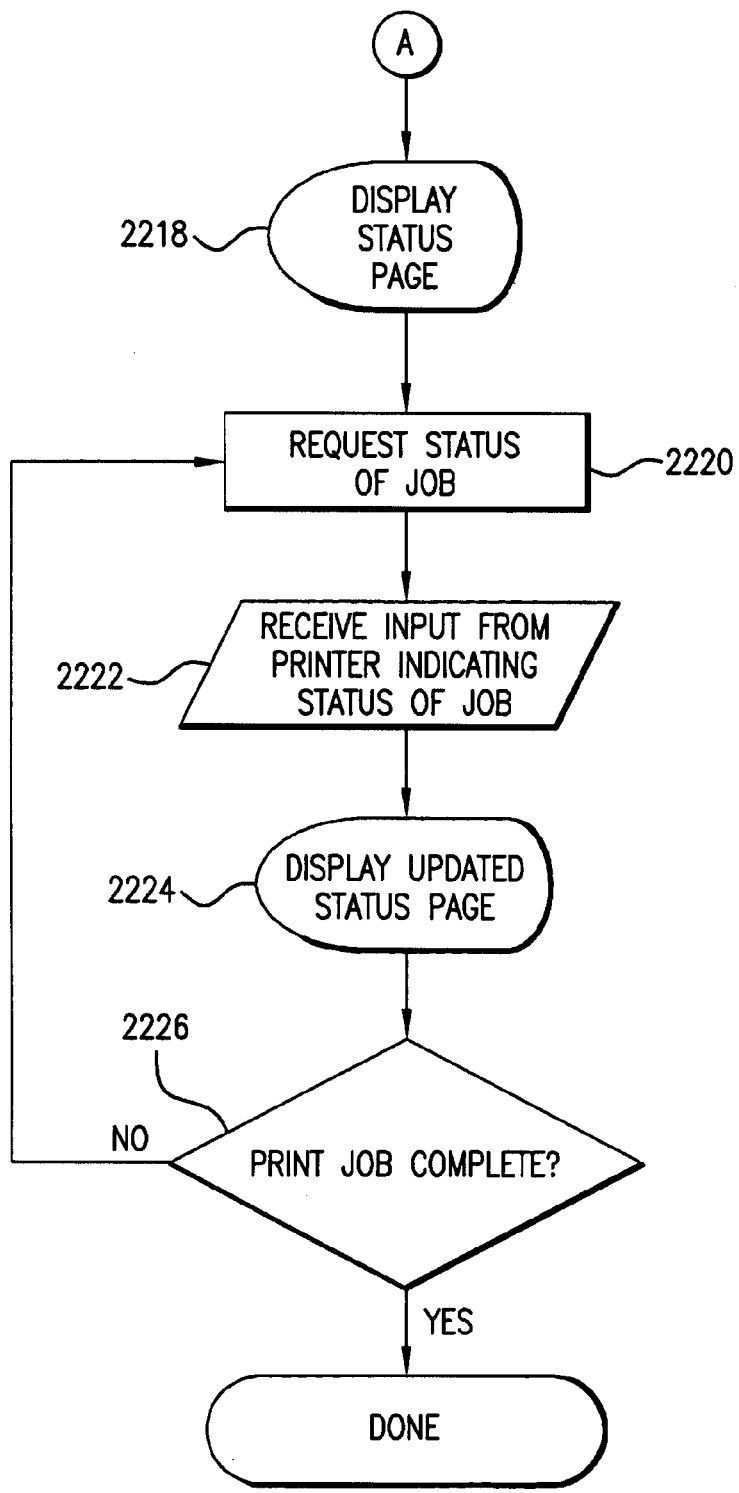

FIG. 22A and FIG. 22B illustrate the operation of the print WEB content 1220 (while being executed at step 2014). First, the print WEB content 1220 causes generic access requests to be generated in order to retrieve a target image (step 2202).

Figure 23:
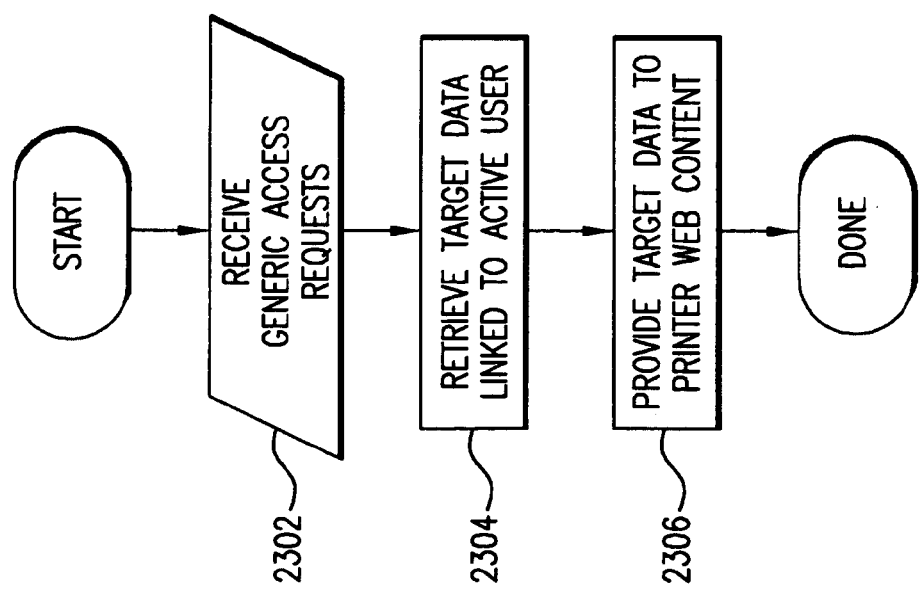
FIG. 23 illustrates further the operation of the extension component in the personal computer.

FIG. 23 illustrates the operation of the extension 1414 to respond to the generic access requests generated at step 2202. Referring briefly now to FIG. 23, the extension 1414 receives these generic access requests at step 2302. In response, the extension 1414 retrieves the set of target data that is linked to the active user (step 2304). [It is noted that in other embodiments, generic access requests may define a format for the retrieved data. This desired format is then communicated to the server and the server provides the target data in the desired format. Importantly, the desired format may be different than the originally stored format. Thus, for example, the set of target data may be stored as a PDF format and returned, for example, in a JPEG format. This may be advantageous in situations wherein a second form of the target data is better suited for printing, displaying, etc]

It can be seen that, for example, if the first user 720 is presently logged into the personal computer 704, the extension 1414 responds by retrieving target data #3 (stored in the second computer 706). This is accomplished by transmitting appropriate HTTP requests for this data to the server 1310. The server 1310 responds by transmitting this data to the extension 1414. Conversely, if the second user 724 is presently logged into the personal computer 704, the extension 1414 responds by retrieving the set of target data #3.

The extension 1414 then operates to provide the retrieved target data to the Document Print WEB Content 1220 in an appropriate manner (step 2306).

Referring again to FIG. 22, the WEB content 1220 receives the retrieved target data (from the extension 1414) at step 2204. In response, the WEB content 1220 causes the personal computer 704 to display a print dialog box with a print preview image (step 2206).

Figure 24:
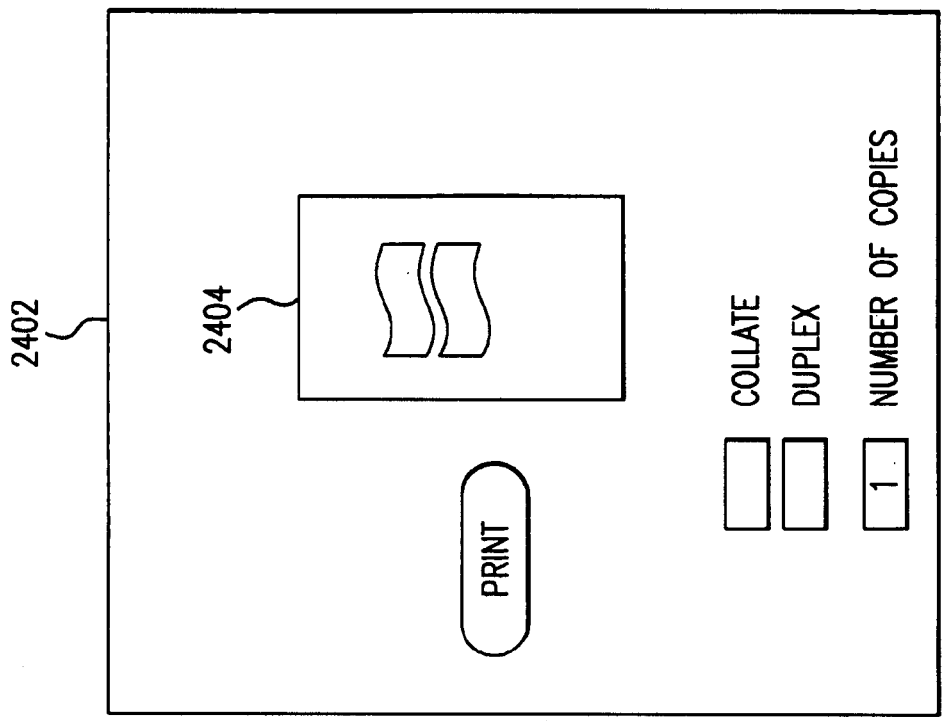
FIG. 24 illustrates an exemplary print dialog box.

FIG. 24 illustrates an exemplary print dialog box 2402 that may be displayed by the personal computer 704 at step 2206. As shown, the dialog box 2402 displays a print preview image 2404 that allows the user to define particular print settings. In this example, the print dialog box 2402 allows the user to enter the number of copies, select a duplex option and/or a collate option.

Importantly, these options are based upon the capabilities of the printer 710. The print preview image that is displayed is based, in part, upon the retrieved target image (i.e., the target image #3 or the target image #4) as well as the options selected.

Referring again to FIG. 22, the WEB content 1220 is assumed to receive the user input indicating that certain settings have been selected at step 2208 and updates the dialog box 2206 accordingly.

Figure 25:
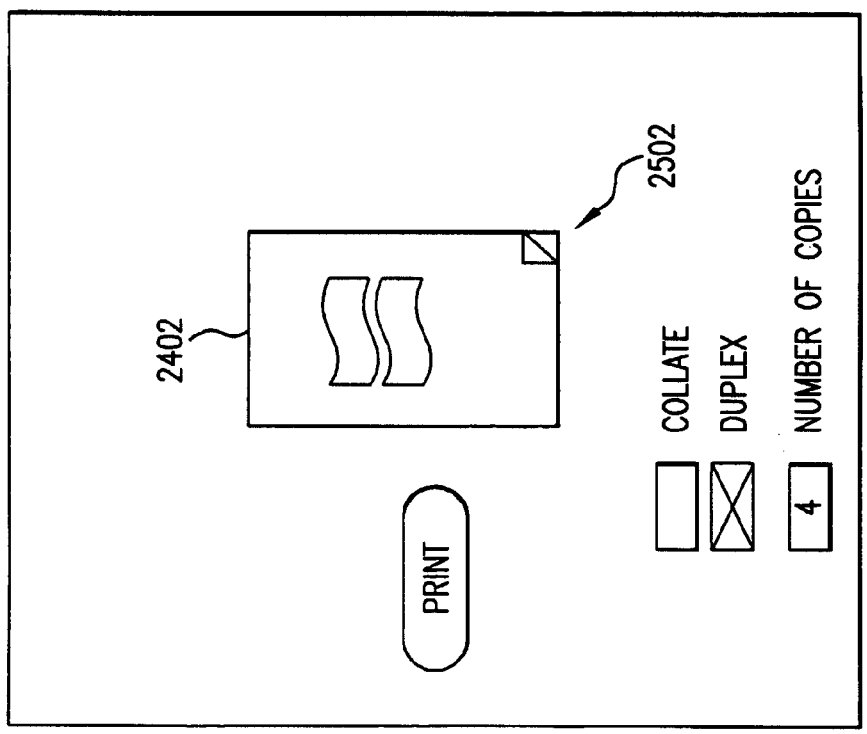
FIG. 25 illustrates the print dialog box after being updated.

FIG. 25 illustrates how the print dialog box 2402 would be updated assuming that the user has selected the duplex option and has entered "4" as the number of copies he/she wishes printed. It is noted that the print pre-view image reflects the duplex option by an icon 2502.

Referring once again to FIG. 22, it is assumed that the WEB content 1220 receives input indicating the user has selected the print button 2410. The WEB content 1220 responds to this input by generating a print job and by transmitting the print job to the WEB server 1212 (steps 2214 and 2216). The print job includes the target data and also includes commands that cause the printer 710 to print the image according to the inputted settings.

The WEB server 1212 receives the print job and provides the print job to the printer control program 1222. The printer control program 1222 commands the print engine 1208 to print the target image according to the settings described by the print job.

After the print job is transmitted to the printer, the WEB content 1220 displays a "print status page" that shows the status of the print job in a dynamic fashion (step 2218). This is accomplished by the WEB content 1220 obtaining certain status information from the printer 710 regarding the printing of the print job (step 2220).

It is noted that the step 2220 may be accomplished by using a number of techniques. For example, PML (Peripheral Management Language) polling may be used. Optionally, the techniques taught in the pending application entitled "Method and Apparatus for Providing Print Job Status", may be used. That application, Ser. No. 09/702,766, was filed Nov. 1, 2000 in the US Patent Office. That application is incorporated herein by reference.

As the status information is received (step 2222) back from the printer 710, the WEB content 1220 updates the status page so as to reflect the updated information (step 2224). This process continues until the print job is completed (step 2226).

Figure 26:
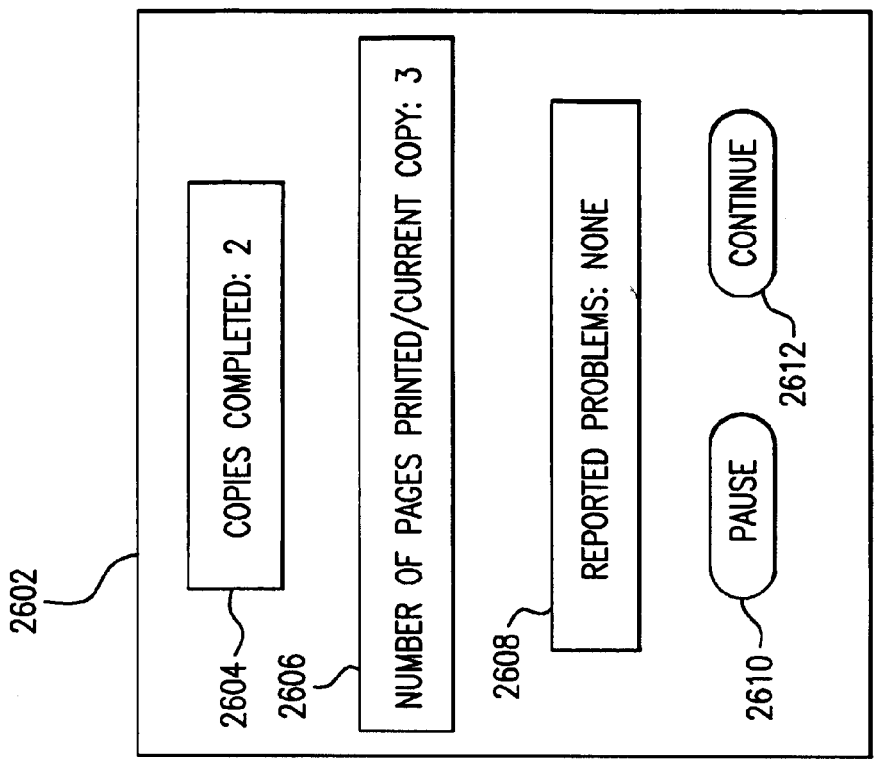
FIG. 26 illustrates an example of a status page.

FIG. 26 provides an example of a status page 2602 that may be displayed at step 2218. As shown, the status page 2602 includes a first field 2604, a second field 2606 and a third field 2608. The first field 2604 displays the number of copies that has been printed. The second field 2604 displays the number of pages printed for the copy that is presently being printed.

The third field 2608 describes certain problems with the current print job encountered during printing. For example, if the printer 710 reports that a paper jam has occurred, this information can be displayed in this third field.

Additionally, the status page 2602 includes a pause button 2610 and a continue button 2612. If the pause button 2610 is selected, the WEB content 1220 sends an appropriate message to the WEB server 1212 indicating that the printing of the present job should be paused.

The WEB server 1212 receives this message and communicates it to the printer control program 1222. The control program 1222 responds by pausing the printing of the present print job.

After the pause button 2610 has been selected and the printing of the present print job has been paused, a user can then select the continue button 2612. When the continue button is selected, the Doc. Print WEB content 1220 sends an appropriate message to the WEB server 1212 indicating printing should be resumed.

The WEB server 710 receives this message and communicates it to the printer control program 1222. The control program 1222 responds by causing the printing of the present print job to resume.

3. CONCLUSION

From the foregoing, it will be appreciated that a computing system according to the invention represents a significant advance in the art. For example, as shown above, a personal computer according to the invention can provide a user with dynamic updates of printer status while the printer is printing a print job. This can be accomplished by utilizing an agent of the printer itself (i.e., the WEB content) which executes on the personal computer itself. Thus, in this manner, the printer itself provides its own status information, via the printer's agent.

It should be noted that the flow charts provided in the FIGS referenced above, show a specific order of steps it is understood that the order of these steps may differ from that which is depicted. Also, two or more steps may be performed concurrently or with partial concurrence. It is understood that all such variations are with the scope of the invention.

Additionally, although specific embodiments of the invention have been described and illustrated, the invention is not to be limited to the specific forms or arrangements of parts so described and illustrated. Accordingly, the invention is limited only by the claims and equivalents thereof.

What is claimed is:

1. In a computer, a method of printing an image, comprising:
   (a) selecting a set of data to be accessed in response to a generic access request;
   (b) receiving content from an external device, the content executable by the computer to cause the computer to generate a generic access request to retrieve a set of data describing an image and further executable to use the retrieved set of data to generate a print job;
   (c) executing the content so as to generate the generic access request;
   (d) responding to the generic access request by retrieving the selected set of data; and
   (e) executing the content so as to use the retrieved set of data to generate the print job.

2. The method of claim 1,
   wherein the computer is a client computer connected to the external device via a network; and
   wherein the external device is a server computer.

3. The method of claim 1, further comprising:
   (f) transmitting the print job to a printer; and
   wherein the printer is responsive to the print job by printing the image.

4. The method of claim 1, further comprising:
   (f) transmitting the print job to a printer; and
   wherein the external device is the printer.

5. The method of claim 1, wherein the image is a multi-page document.

6. The method of claim 1, wherein the image is a single page document.

7. The method of claim 1, wherein step (e) is performed in response to user input.

8. A computer, comprising:
   (a) means for selecting a set of data to be accessed in response to a generic access request;
   (b) means for receiving content from an external device, the content executable by the computer to cause a computer to generate a generic access request to retrieve a set of data describing an image and further executable to use the retrieved set of data to generate a print job;
   (c) means for executing the content so as to generate the generic access request;
   (d) means for responding to the generic access request by retrieving the selected set of data; and
   (e) means for executing the content so as to use the retrieved set of data to generate the print job.

9. The computer of claim 8, further comprising:
   (f) means for transmitting the print job to a printer.

10. A program storage medium readable by a computer, tangibly embodying a program of instruction executable by the computer to perform method steps for printing a print job, the method steps comprising:
    (a) selecting a set of data to be accessed in response to a generic access request;
    (b) receiving content from an external device, the content executable by the computer to cause the computer to generate a generic access request to retrieve a set of data describing an image and further executable to use the retrieved set of data to generate a print job;
    (c) executing the content so as to generate the generic access request;
    (d) responding to the generic access request by retrieving the selected set of data; and
    (e) executing the content so as to use the retrieved set of data to generate the print job.

11. The program storage medium of claim 10, the method steps further comprising:
    (f) transmitting the print job to a printer; and
    wherein the printer is responsive to the print job by printing the image.

12. The program storage medium of claim 10, wherein the selecting step is performed in response to user input.

* * * * *

UNITED STATES PATENT AND TRADEMARK OFFICE
CERTIFICATE OF CORRECTION

PATENT NO. : 7,196,803 B1
APPLICATION NO. : 09/712337
DATED : March 27, 2007
INVENTOR(S) : Shell S. Simpson et al.

It is certified that error appears in the above-identified patent and that said Letters Patent is hereby corrected as shown below:

On the face page, in field (57), under "Abstract", in column 2, line 2, delete "drive" and insert -- driver --, therefor.

In column 9, line 9, after "access" delete "1".

Signed and Sealed this

Eighteenth Day of August, 2009

David J. Kappos
*Director of the United States Patent and Trademark Office*